Figure 1:
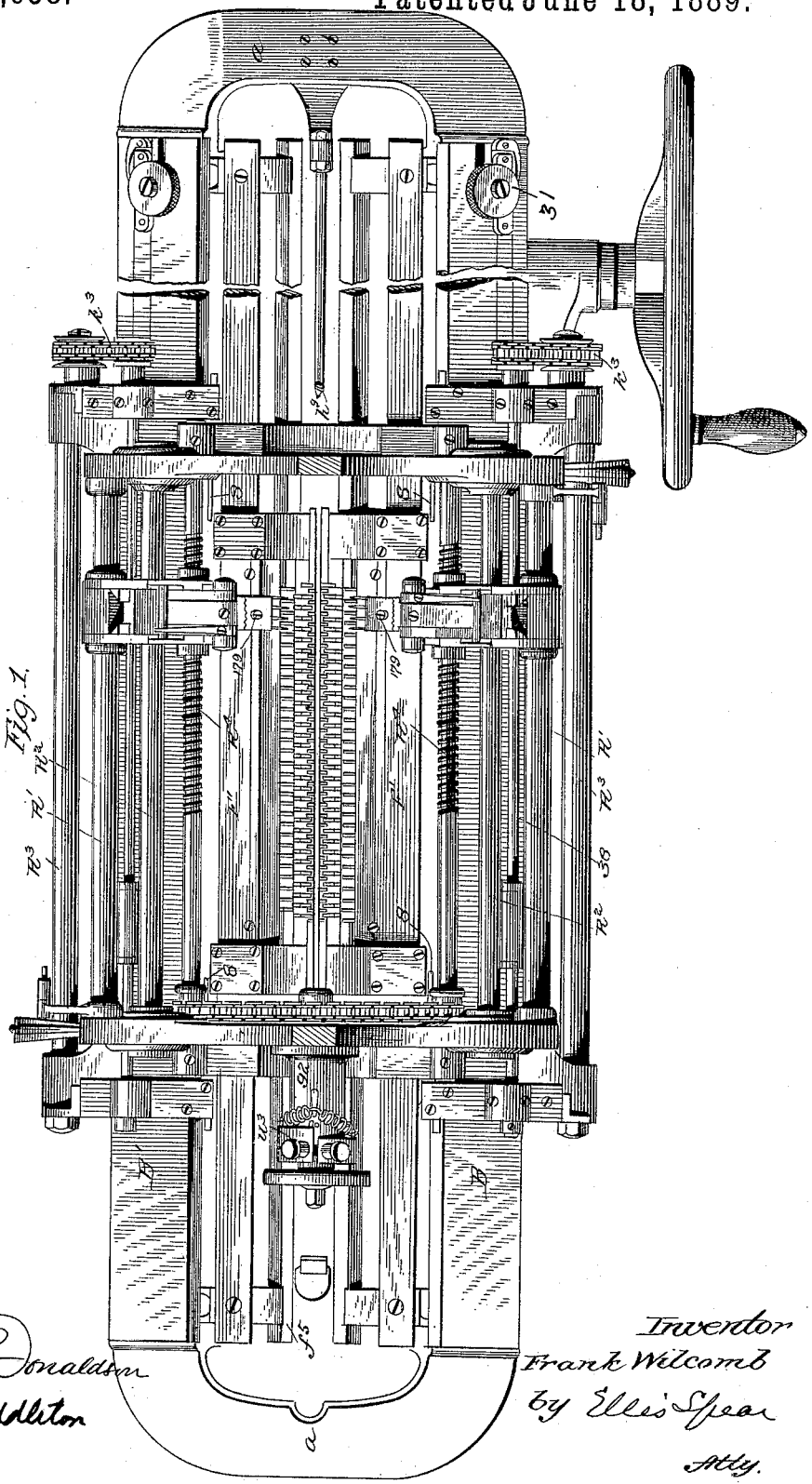

(No Model.) 15 Sheets—Sheet 1.

F. WILCOMB.
STRAIGHT KNITTING MACHINE.

No. 405,638. Patented June 18, 1889.

Attest:
Walter Donaldson
F. L. Middleton

Inventor
Frank Wilcomb
by Ellis Spear
Atty.

(No Model.) 15 Sheets—Sheet 2.

F. WILCOMB.
STRAIGHT KNITTING MACHINE.

No. 405,638. Patented June 18, 1889.

(No Model.) 15 Sheets—Sheet 4.

F. WILCOMB.
STRAIGHT KNITTING MACHINE.

No. 405,638. Patented June 18, 1889.

Attest:
F. L. Middleton

Inventor
Frank Wilcomb
by Ellis Spear
Atty.

(No Model.) 15 Sheets—Sheet 5.

F. WILCOMB.
STRAIGHT KNITTING MACHINE.

No. 405,638. Patented June 18, 1889.

Attest:
Walter Donaldson
F. L. Middleton

Inventor
Frank Wilcomb
by Ellis Spear
Atty.

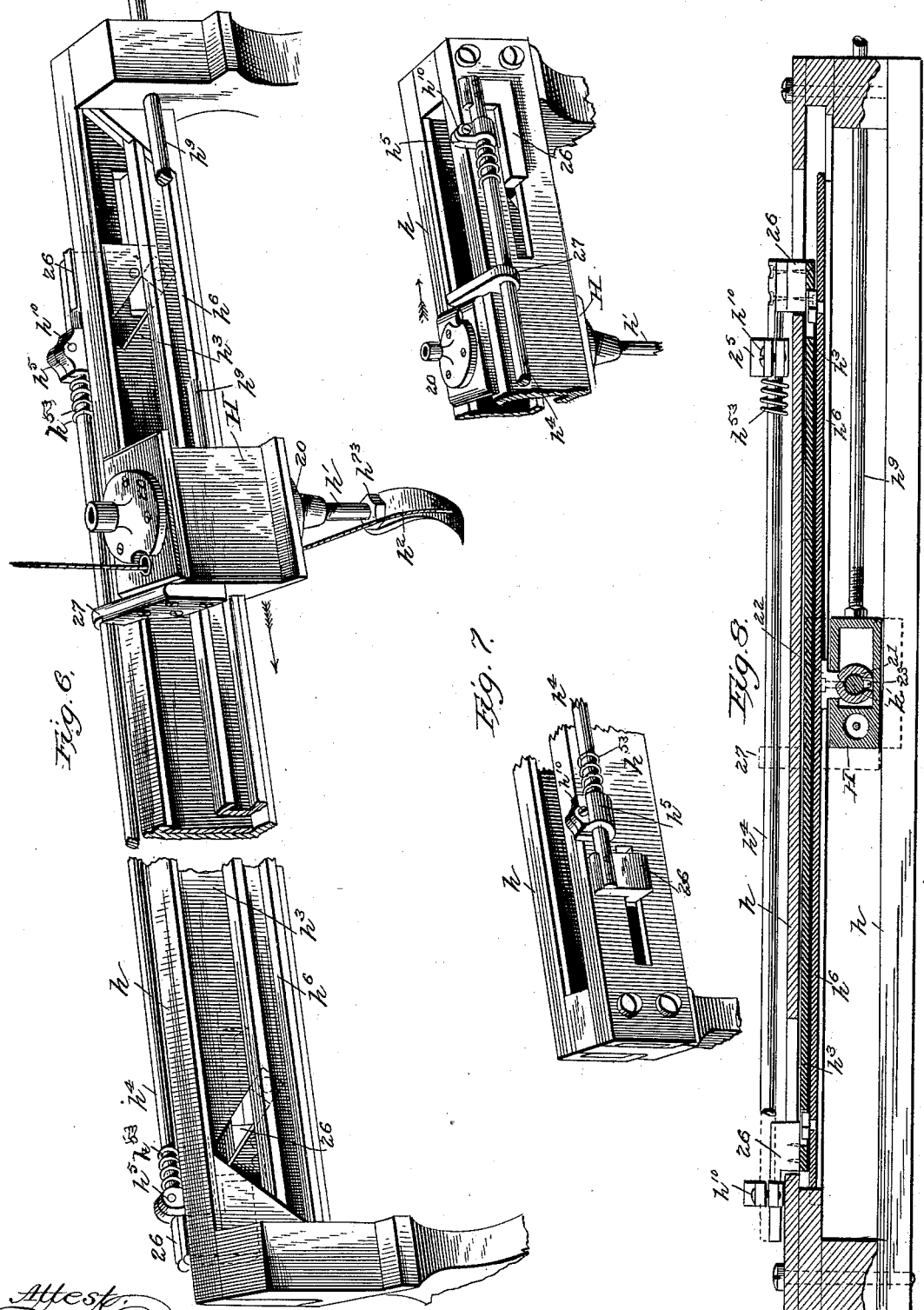

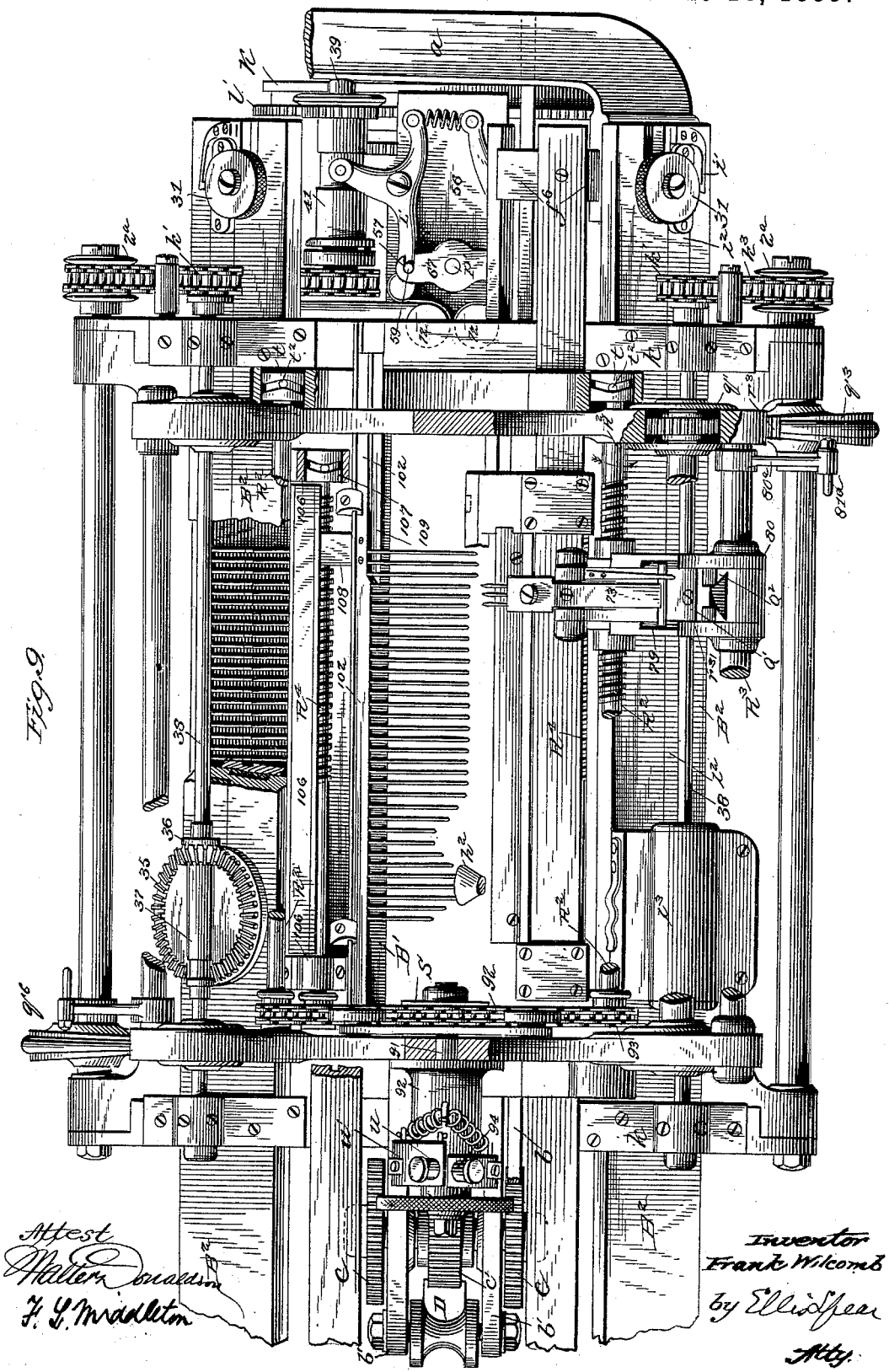

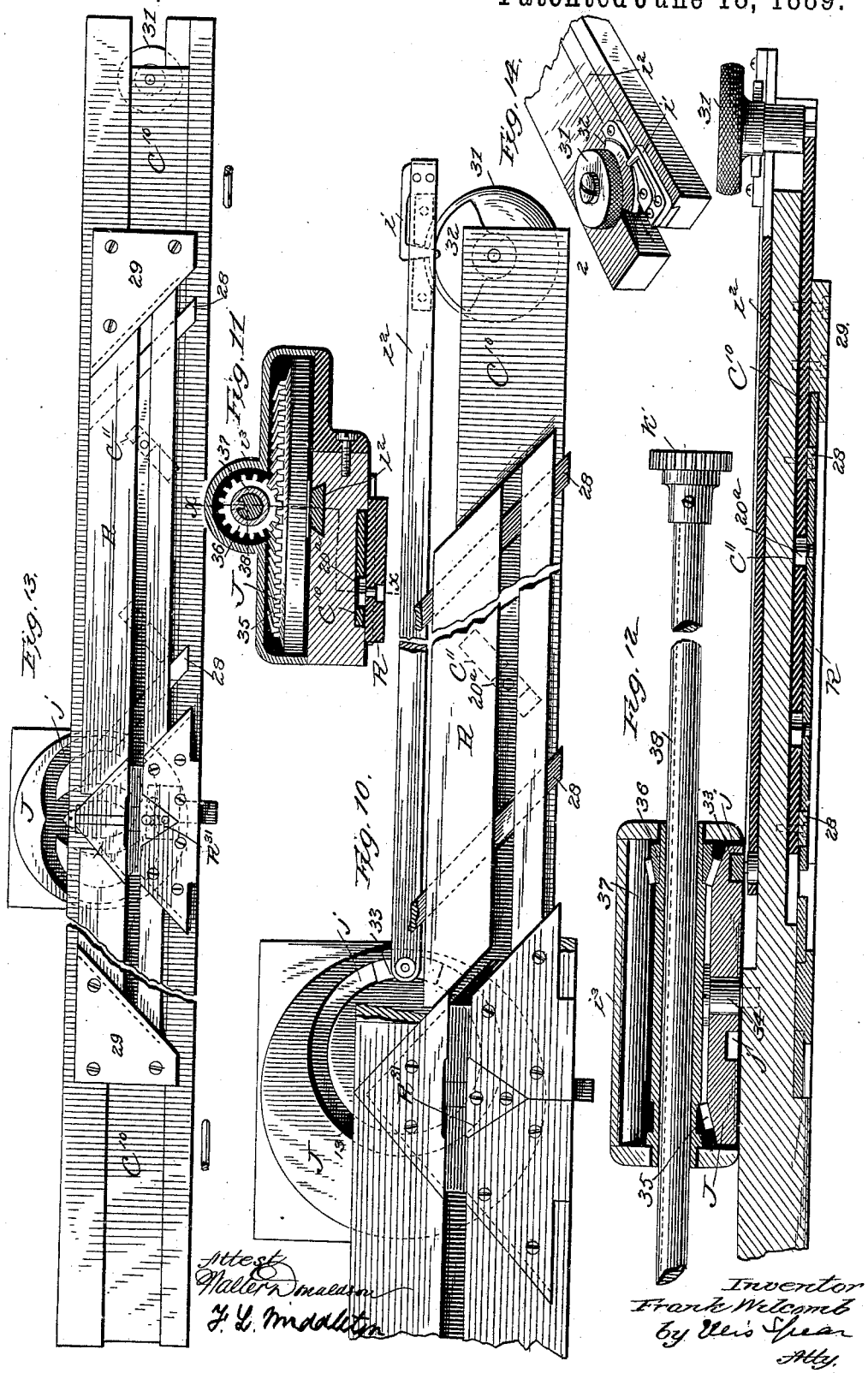

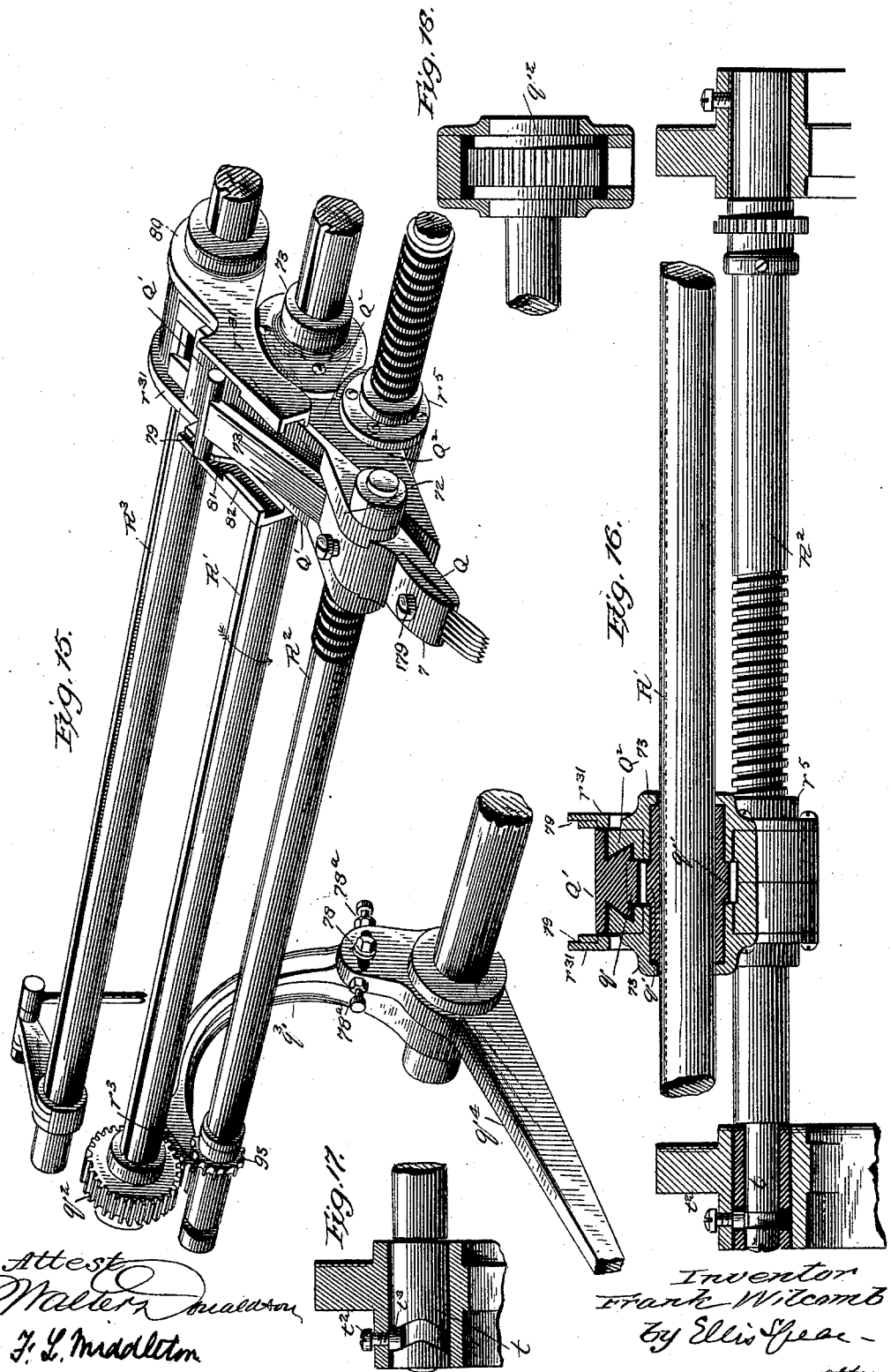

(No Model.) 15 Sheets—Sheet 10.
F. WILCOMB.
STRAIGHT KNITTING MACHINE.
No. 405,638. Patented June 18, 1889.
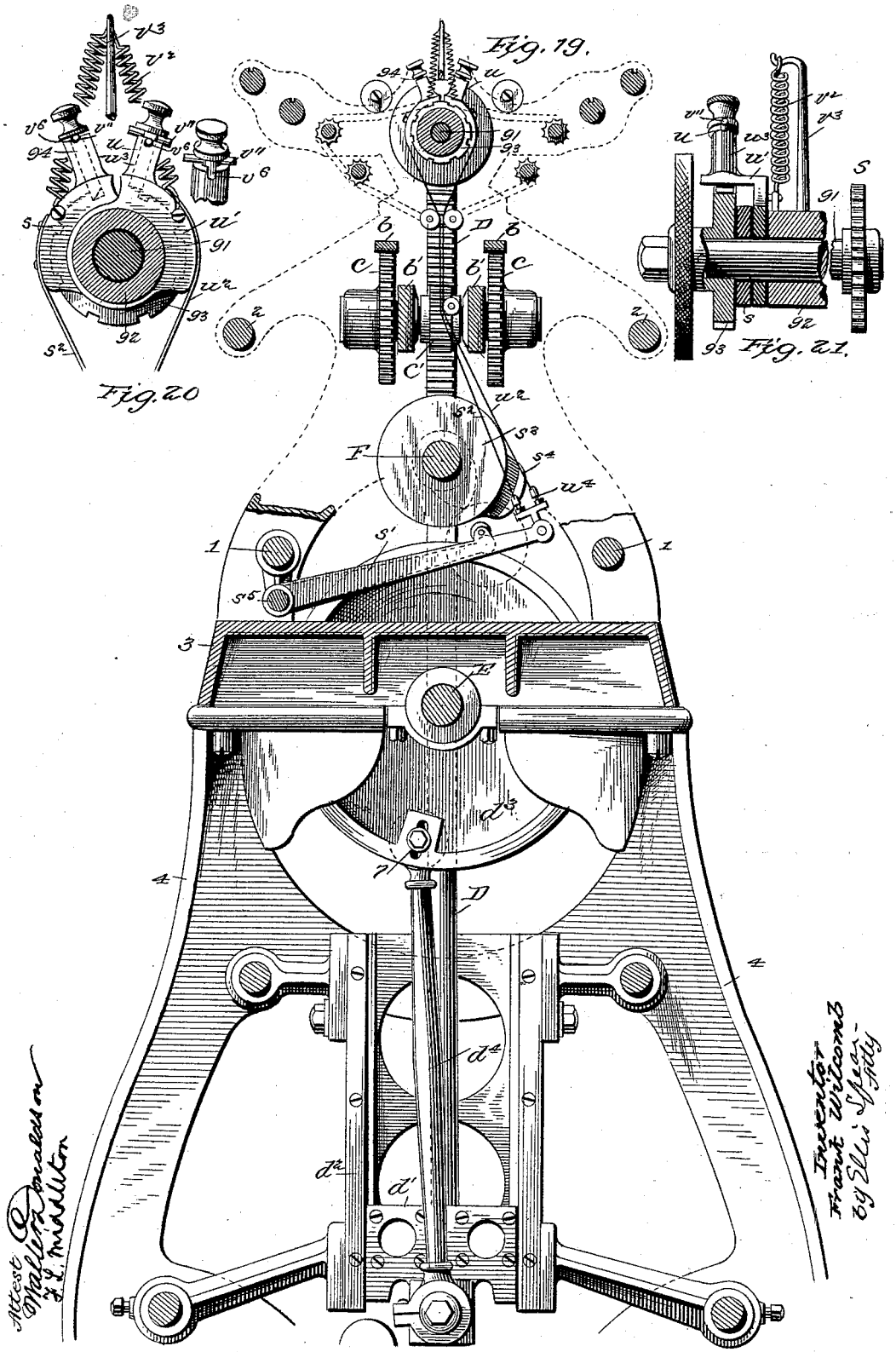

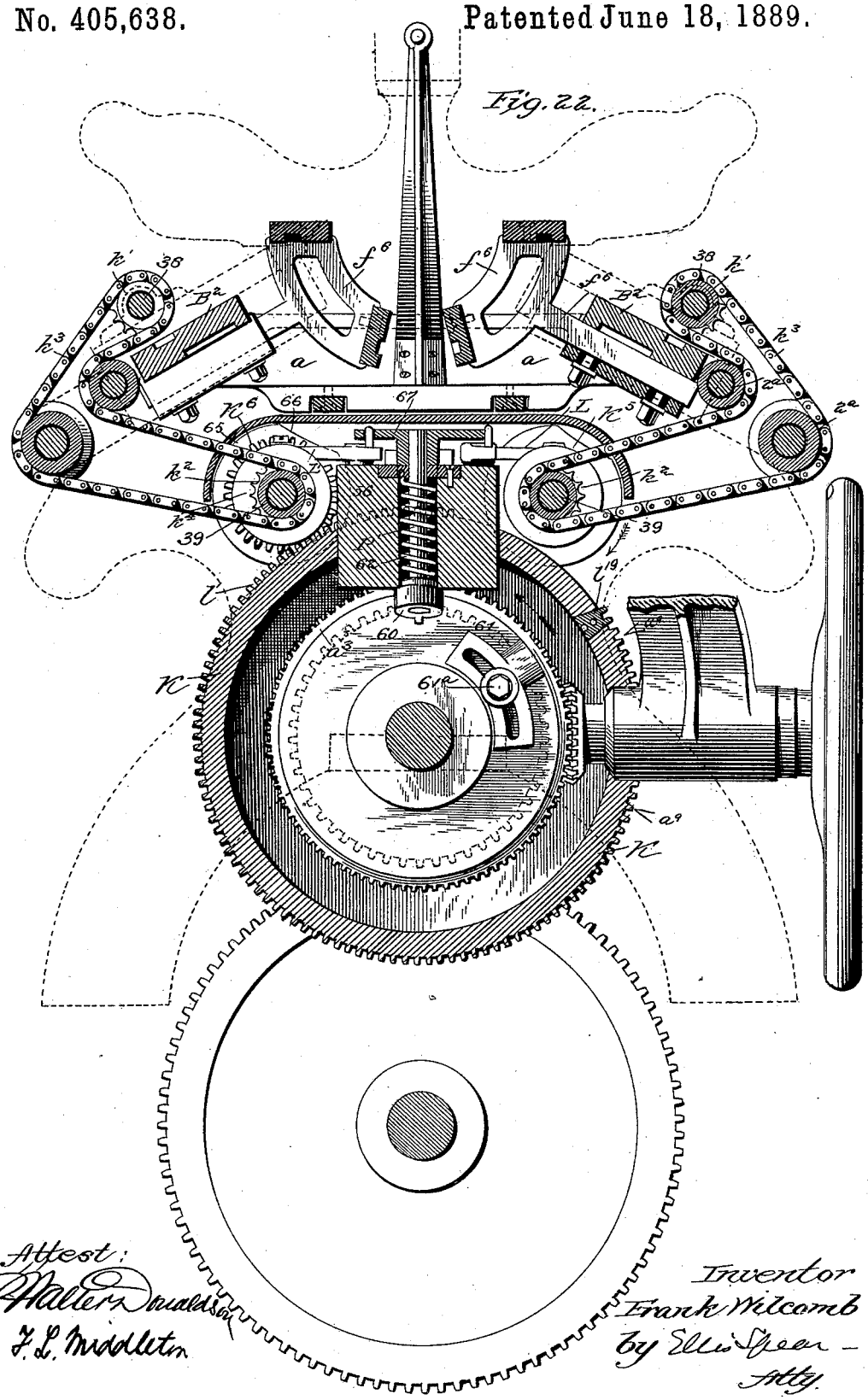

(No Model.) 15 Sheets—Sheet 12.

F. WILCOMB.
STRAIGHT KNITTING MACHINE.

No. 405,638. Patented June 18, 1889.

(No Model.) 15 Sheets—Sheet 13.

F. WILCOMB.
STRAIGHT KNITTING MACHINE.

No. 405,638. Patented June 18, 1889.

Attest
Walter Donaldson
F. L. Middleton

Inventor
Frank Wilcomb
by Ellis Spear
Atty

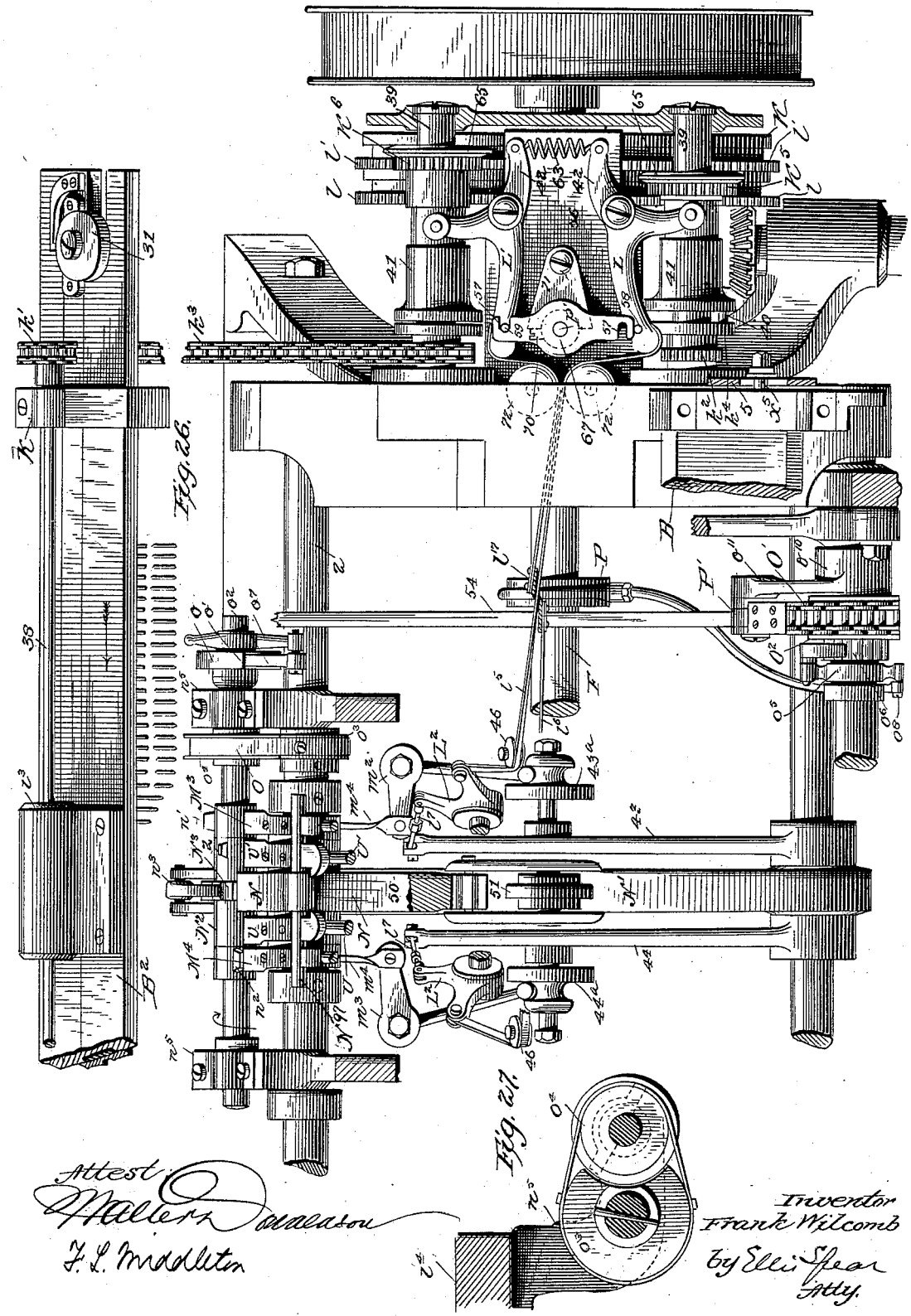

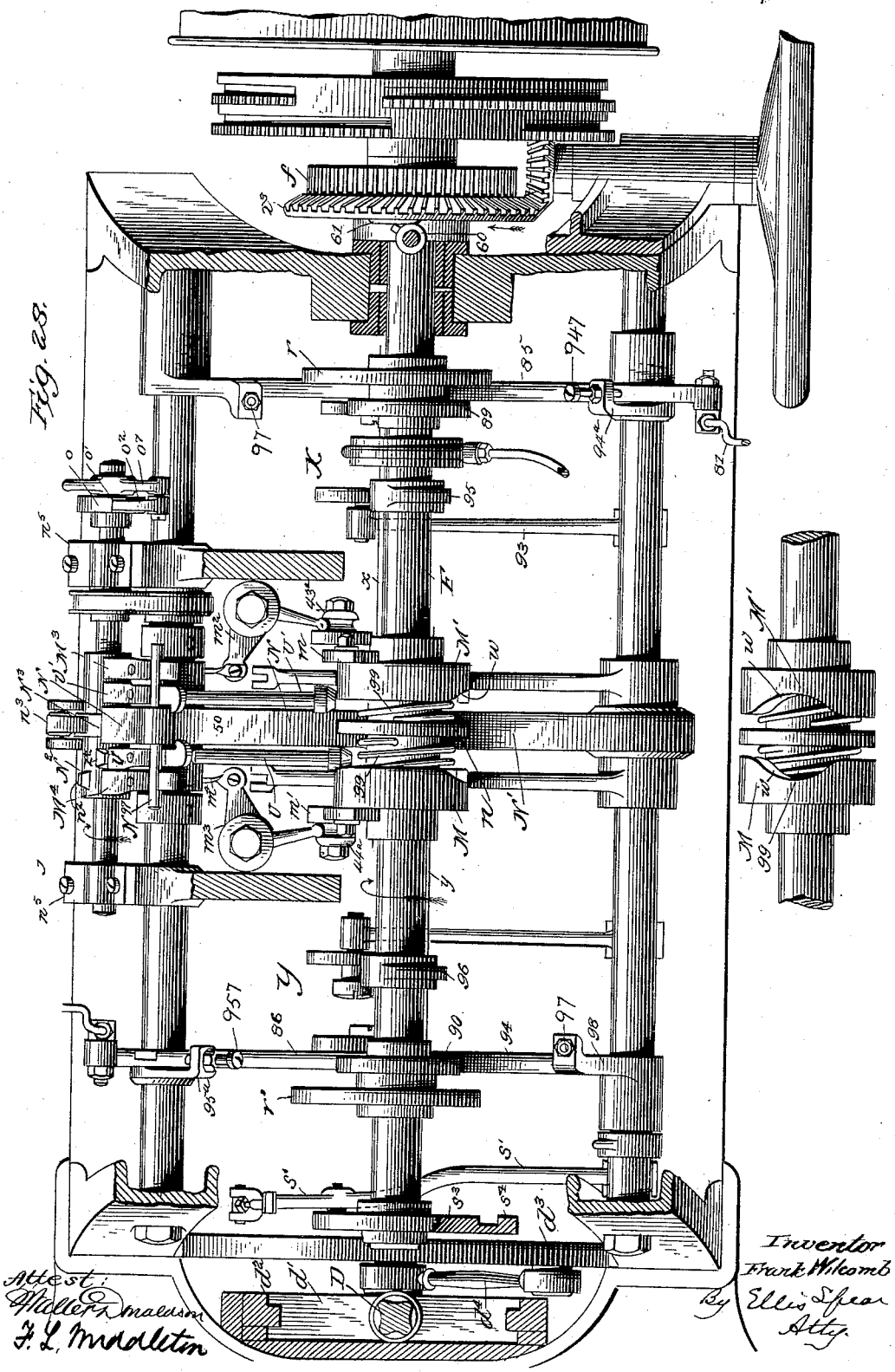

UNITED STATES PATENT OFFICE.

FRANK WILCOMB, OF PROVIDENCE, RHODE ISLAND, ASSIGNOR TO THE WILCOMB MANUFACTURING COMPANY, OF SAN FRANCISCO, CALIFORNIA.

STRAIGHT-KNITTING MACHINE.

SPECIFICATION forming part of Letters Patent No. 405,638, dated June 18, 1889.

Application filed April 18, 1888. Serial No. 271,026. (No model.)

*To all whom it may concern:*

Be it known that I, FRANK WILCOMB, of Providence, in the county of Providence and State of Rhode Island, have invented a new and useful Improvement in Straight-Knitting Machines; and I do hereby declare that the following is a full, clear, and exact description of the same.

My invention relates to straight-latch-needle knitting-machines.

My improved machine operates in respect to the action of the needles and transfer-points on the principle shown in Letters Patent of the United States granted me on the 12th day of October, 1886, No. 350,791, and is designed to carry out the method of that patent by improved mechanisms, whereby great rapidity, accuracy, and ease of movement are secured and the capacity of this class of knitting-machines is greatly enlarged. In the machine hereinafter described the mechanism for working the needles back and forth in the ordinary operation of knitting is not specially described, as it is not claimed, and may be of any ordinary or suitable construction. In addition to the ordinary knitting movements of the needles, the needles have also in the machine described herein movements in connection with transfer-points for the purpose of enabling the latter to transfer stitches from one needle to another, and in connection with these movements of the needles last specified are corresponding movements of the transfer-points. These combined movements of the mechanism of my present invention are such that the loop carried by the needle is exposed, engaged by the transfer-point, and thereby lifted, moved laterally to the next needle, and by common movement of the needle and points again in engagement is returned from the point to the needle. The action of all this transferring or fashioning mechanism is simultaneous or concurrent with that of the knitting, though quite independent thereof.

My invention includes a special organization with connections to the main shaft of the machine for operating the needles forward and backward to accomplish the first movement necessary in the fashioning action, the said organization being designed for the purpose of imparting to the needles a varying movement in the forward and backward thrust, whereby the loops carried thereby are not subject to strain, as the needles and points are projected through them, and whereby also the action of transferring stitches may be better accomplished.

Further, my invention consists in the peculiar form of driving-connections from the main shaft, by which the needles, while being positively and accurately operated during the fashioning, are not rendered sensitive to any undue movement of said connection arising from wear and tear on parts, and by which, further, the movement of the needles is controlled for better results in the fashioning operation.

My invention consists, further, in holding devices to insure the maintenance of the operating-connection between the needles and the driving-power during the proper interval, and to insure also the inaction of said connections after the fashioning has been performed and until the same action is to be repeated.

My invention also consists in an improved form of transfer-point carriage and means for supporting the same and for operating it forward and backward and moving the points in a vertical plane, and also in combining with said carriage positive operating means for shifting it laterally.

Further, my invention consists in the means for operating the devices last mentioned for shifting the points so that those on one side of the machine will effectively operate to secure the desired result alternately with those upon the other side, both being driven by the same connections to the shaft.

Further, my invention consists in combining with the device for rendering inactive the empty needles, or those from which loops have been taken, means for operating said device positively and in unison with the shifting of the point-block.

Further, my invention includes pattern mechanism for causing the fashioning mechanism to operate at the desired intervals, and in combining with said pattern mechanism important supplemental controlling devices, which are hereinafter fully set forth, and by which the rapidity and accuracy of the machine are greatly increased.

In this machine a reversible thread-guide is employed, operating with improved results on the needle-latches by opening any latches which may be closed, as it moves along first one row and then the other, and performing advantageous functions in connection with the fashioning operation by shielding the thread from the empty needles, as hereinafter described. This carrier is reciprocated by connections to the reciprocating parts of the machine, and its action of reversing is automatic, and in addition to the above my invention includes the devices for automatically operating the guide to reverse its position, whereby the point at which the thread-guide shall be reversed to feed the other row of needles may be determined by adjustment.

While I have indicated above some of the points, the new organization and the details can only be understood by detail description including the whole machine. The points of invention are particularly claimed.

Figure 2:
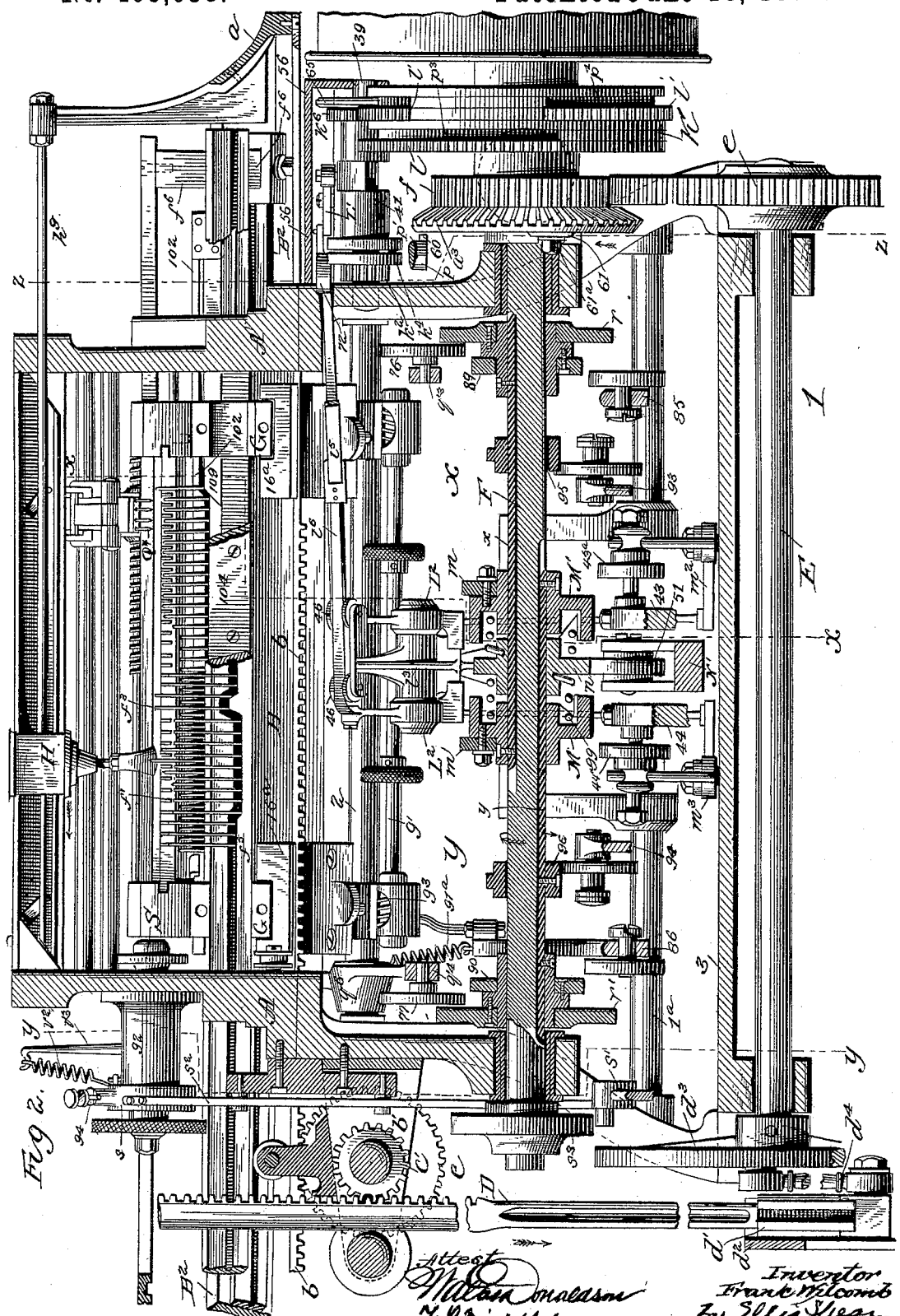
Figure 4:
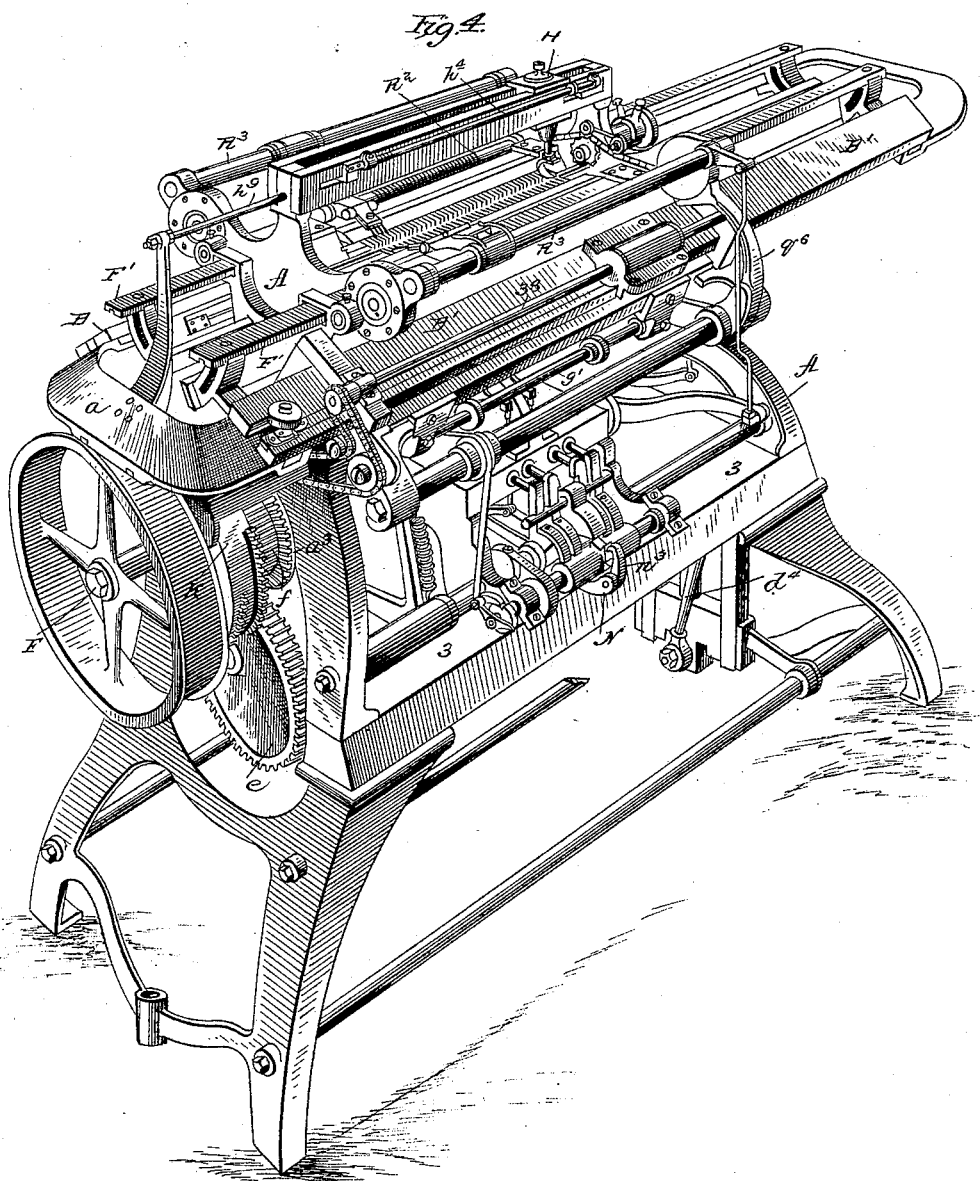
Figure 5:
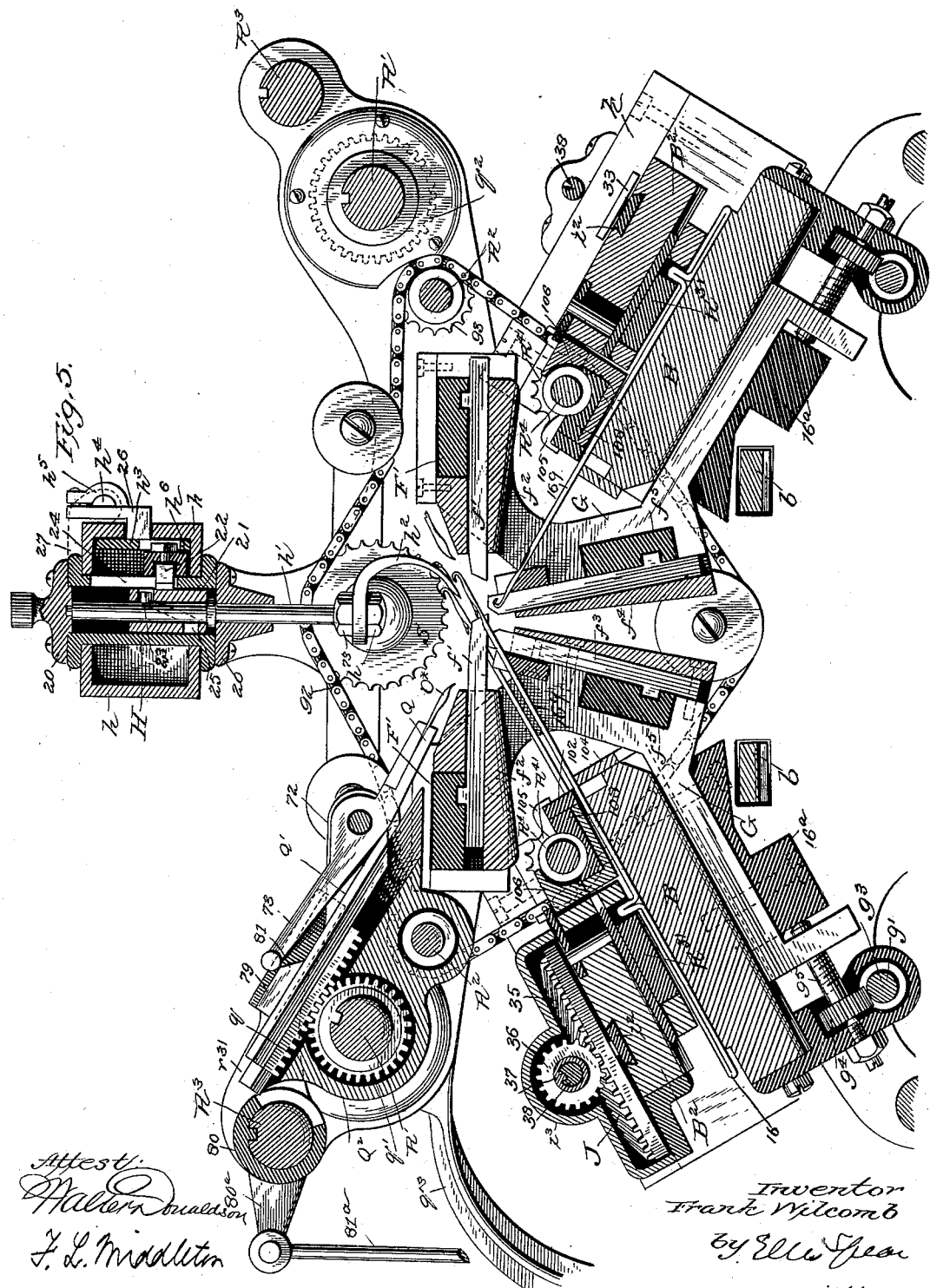
Figure 23:
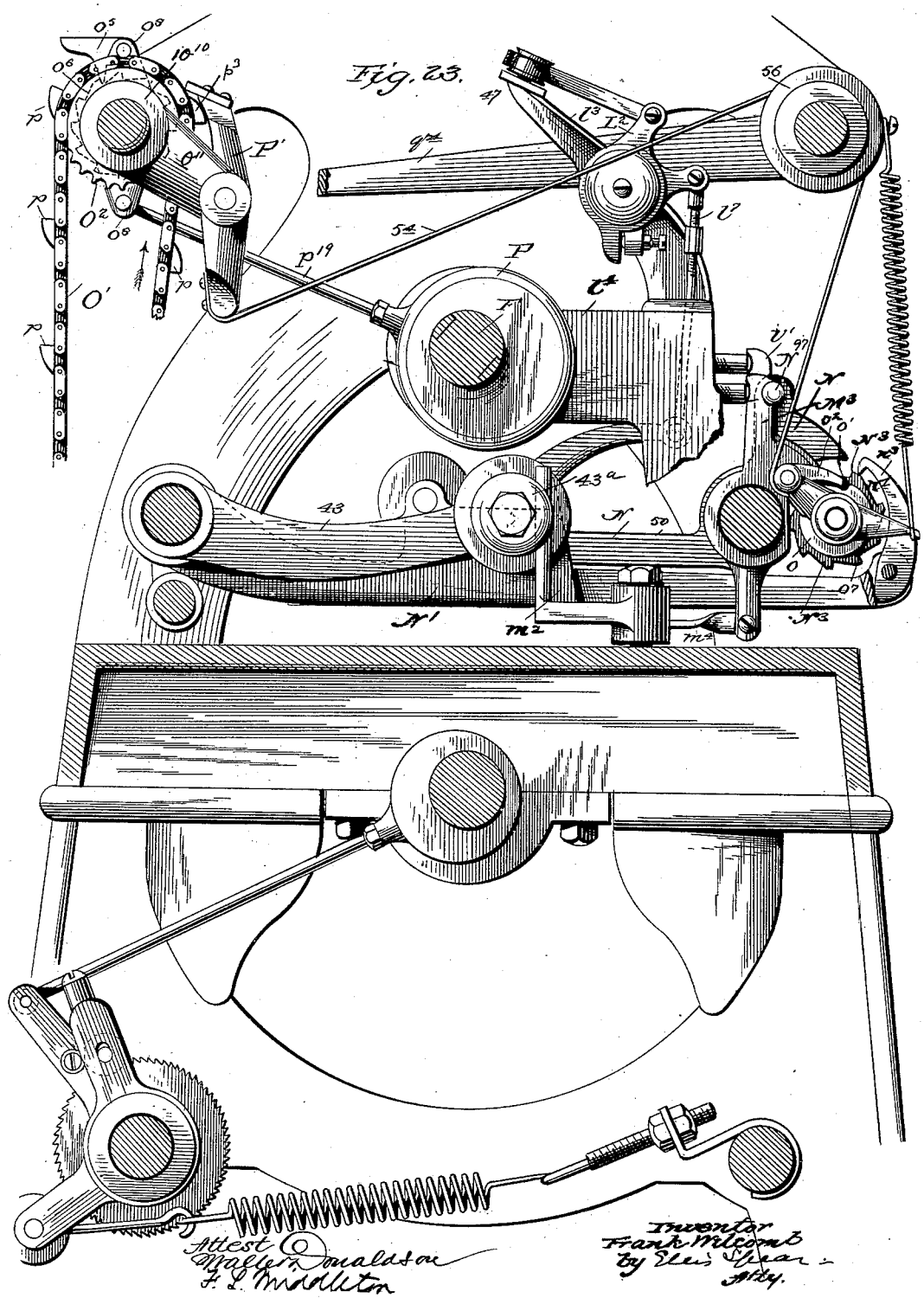
Figure 24:
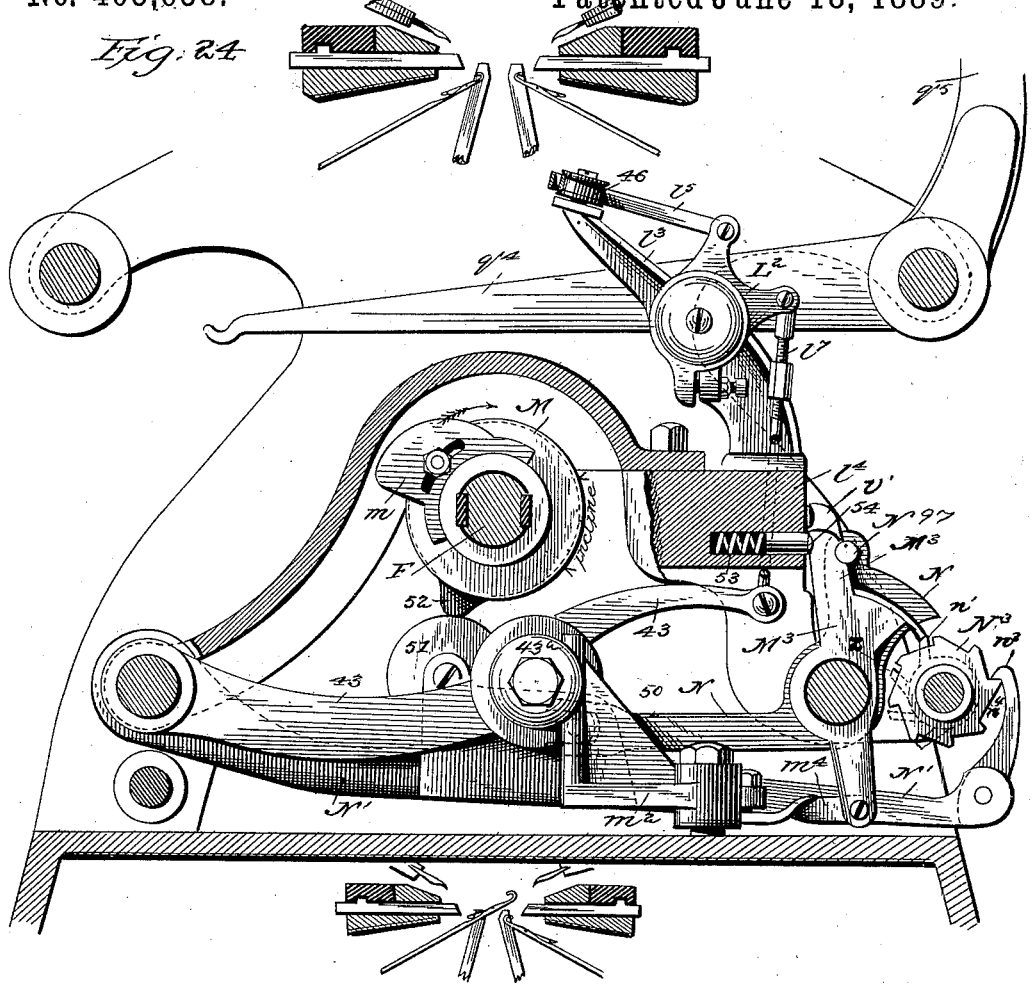
Figure 25:
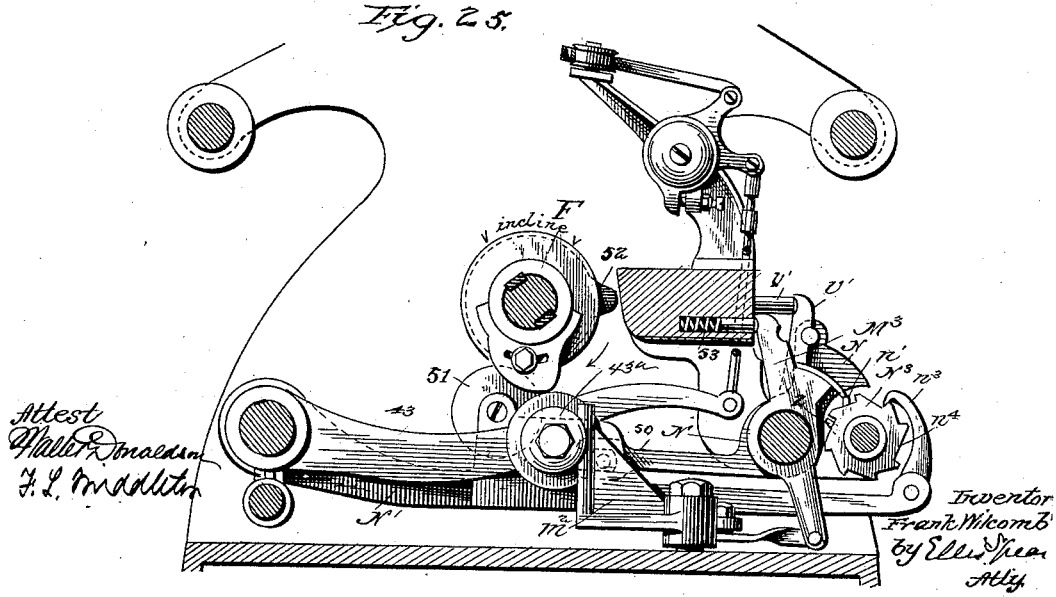

In the accompanying drawings, Figure 1 is a plan view of the machine with the thread carrier and guides therefor removed, a part of the frame being in section. Fig. 2 is a vertical longitudinal section of the machine, and Fig. 3 a vertical transverse section on line $xx$ of Fig. 2, from point 1, some of the parts back of the sectional line being also shown in section for the sake of clearness. Fig. 4 is a perspective view of the machine. Fig. 5 is a section taken transversely through the upper portion of the machine, showing the relative arrangement of the needles, sinkers, and movable loop-casting-off bits, transfer-points, and the immediate operating means for these devices, this figure also showing the thread-carrier and operating devices therefor in section, and the stitch-cams. Fig. 6 is a perspective view of the thread-carrier with the operating devices therefor and the means for determining the point at which the thread-guide shall reverse its action, one of the guide-bars being removed. Fig. 7 is also a perspective view, a portion being broken away. Fig. 8 is a horizontal section through the carrier and operating devices, some of the parts being shown in plan. Fig. 9 is a plan view of the machine, some of the parts being broken away and some removed for clearness of illustration. Fig. 10 is a bottom view of a portion of the slide-bar, including the shifting cam-plate for operating the needles forward and backward, and the eccentric for actuating said plate, with the connections between the two. Fig. 11 is a transverse section through the bar and shifting plate, showing in elevation the eccentric. Fig. 12 is a longitudinal section on line $xx$ of Fig. 11. Fig. 13 is a bottom plan view of the slide-bar as adapted for narrowing at both ends of the machine, two shifting cam-plates being shown, and an eccentric disk having two grooves for operating the plates. Fig. 14 is a detail perspective view of the means for operating the shifting cams manually and the connection between this and the operating-bar to be operated by the action of the machine. Fig. 15 is a perspective view of the carriage for supporting and operating the points, including, also, the means of support and the devices in direct connection therewith for operating the point-carriage. Fig. 16 is a transverse section through the point-carriage, a portion thereof, with its operating devices, being in elevation. Figs. 17 and 18 are detail views relating to this portion of the machine. Fig. 19 is a transverse section through the main or lower portion of the supporting-frame on line $yy$ of Fig. 2, looking from point 1, the upper portion being shown in dotted lines, this figure illustrating particularly the mechanism for imparting reciprocating motion to the slide-bars, and a portion of the devices for effecting one of the fashioning movements—i. e., the shifting of the transfer-points. Figs. 20 and 21 are detail sectional views of a part of the operating devices for shifting the needles either for narrowing or widening the fabric in fashioning. Fig. 22 represents a transverse sectional view on line $zz$ of Fig. 2, looking from point 1, the frame being shown in dotted lines. Fig. 23 is a transverse section through part of the machine, showing the pattern mechanism, a part of the supplemental controlling devices, the intermediate connections to the pattern mechanism, and a part of the operating mechanism for fashioning. Fig. 24 illustrates in section a portion of the machine embracing the cam-shaft and such of the mechanism as is employed for giving the first movement to the narrowing devices which are employed for moving the needles forward and backward, the position of the said devices being such that the continued revolution of the shaft in the direction indicated effects this movement. The means for controlling the action of the operating devices and causing them to actuate at the proper moment is also shown here, together with the relative position of the needles, sinkers, cast-off bits, and transfer-points at the time the parts are in the position indicated. Fig. 25 is a similar view with the parts in an advanced position and showing the corresponding change in the relation of the needles and transfer-points. Fig. 26 is a plan view of the devices for actuating the needles to move forward or backward, the slide-bar being illustrated to one side with the needles in proper advanced position for the fashioning operation, the relation between the parts being the same as those indicated in the last figure, the pattern mechanism and also the devices in connection therewith for controlling the action of the operating parts being shown here also. Fig. 27 is a detail view of a brake device. Fig. 28 is a plan view of the cam-shaft of the machine, some of the operating-levers, and the controlling devices for the fashioning devices.

In the drawings, A A' are the end frames of the machine, connected and braced by upper and lower girts 1 and 2 on each side. The frame rests upon a suitable base 3, which is in turn supported by legs or standards 4, and supported by the end frames are the needle-beds B B', Figs. 2 and 3. These are held in place adjustably by screws $X^5$, which pass through slots formed in plates 5, secured to the frame of the machine, as in Fig. 26. The needle-beds carry the guides for the slide-bars, and when the needle-beds are adjusted the distance is thereby varied between the needle-rows for finer or coarser work.

The slide-bars $B^2 B^2$, which carry the stitch-cams $R^{31}$, of substantially ordinary form for operating the needles forward and backward to take the thread, are arranged to reciprocate longitudinally of the machine, and at their ends they are connected by curved cross-braces $a\ a$. For giving the necessary movement to the bars, I employ, preferably, the improved combination of devices shown and claimed by me in an application filed in the United States Patent Office on the 29th of February, 1888, Serial No. 265,724. This briefly consists of a vertically-moving operating-bar D, having connection with the slide-bars and actuated reciprocally by connections to the driving-shaft of the machine. In the present instance, Figs. 2 and 19, the bar is provided with rack-teeth, which mesh with a pinion $c'$, fixed to a shaft supported on the outside of the machine by the brackets $b'\ b'$. On either side of the brackets, gears $c\ c$ are fixed to the shaft, and these are arranged to mesh with rack-bars $b\ b$, located upon either side of the machine and extending longitudinally through openings in the frames. These bars are connected at their ends to the cross-braces $a\ a$, and thus when the operating-bar is reciprocated a like movement will be imparted to the slide-bars through the connections indicated. The reciprocating bar D is carried and guided at its lower end by a cross-head $d'$, arranged to move up and down in guideways $d^2$, supported by the lower frame. The cross-head movement is derived from a face-wheel and pitman $d^3\ d^4$, the former being carried by a shaft E, which has its bearings in the lower supporting-frame, and in turn derives its motion from the main or cam shaft F of the machine by means of the small and large gears $f\ e$. One end of the pitman is adjustably secured to the face-wheel, as at 7, Fig. 19, and the other end is pivotally secured to the cross-head.

Figure 3:
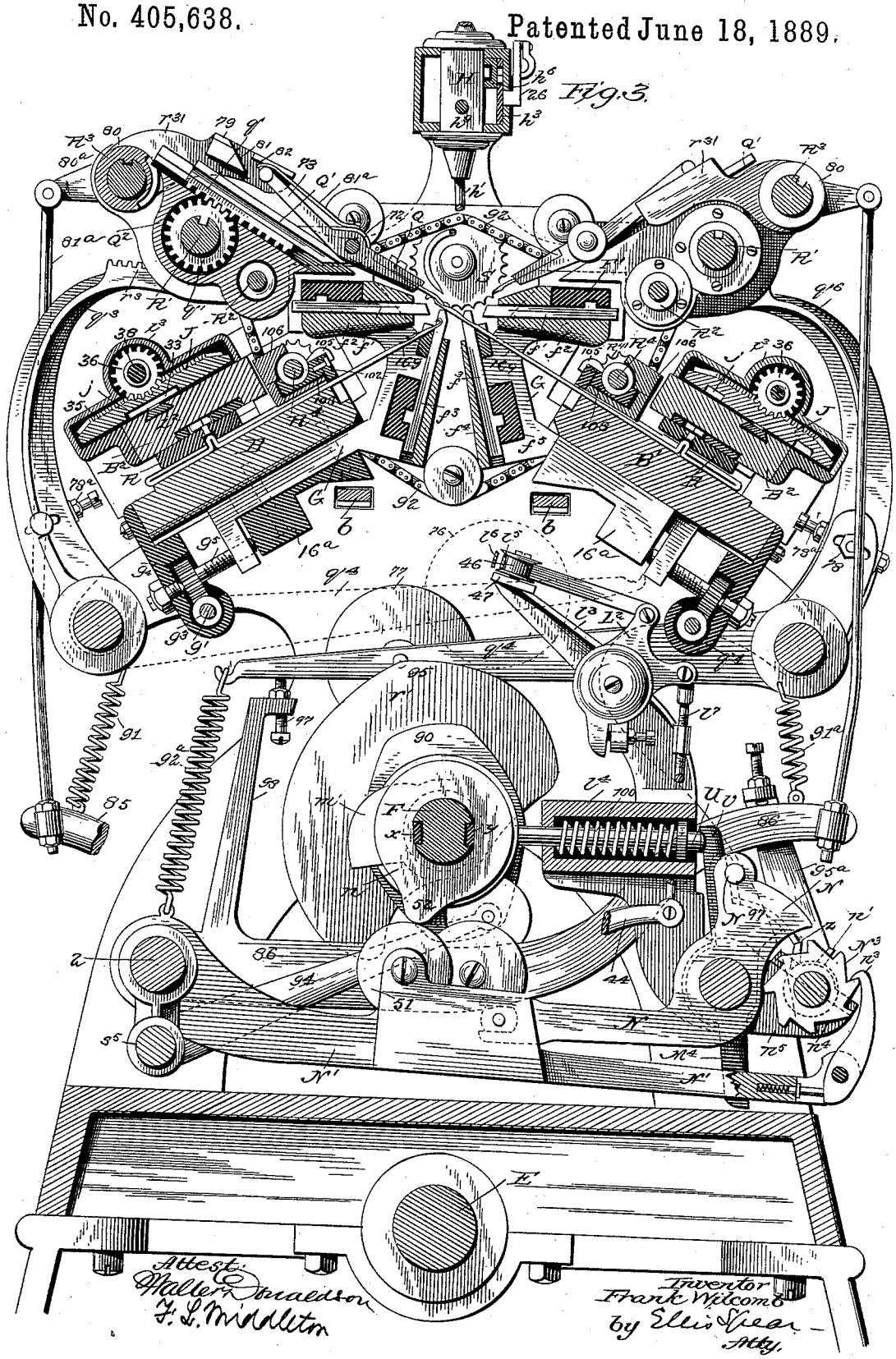

The sinkers $f'$, Figs. 3 and 5, are movable, and are designed to act in conjunction with the needles 169 for measuring off sufficient yarn to form the new loop. They are supported upon beds $f^2\ f^2$ on either side of the machine, and are adapted to move forward and backward in a horizontal plane, being operated by cam-grooves in the slide-bars F'. Movable knockover-bits $f^3$ also co-operate with the needles and movable sinkers, acting after the sinkers have measured off the new lengths of yarn and have retreated from normal position, when the knockover-bits rise to take the place of the retracted sinkers and cast off the old loops, moving them forward into place in the new lengths. They are set at an inclination to render their rising action effective for the purpose, and are supported in bed-plates $f^4$. Slide-bars $f^5$, provided with grooves to receive the heels of the knockover-bits, are employed to give them their necessary movement. This slide-bar $f^5$, as well as that (F') for the sinkers, is actuated by being connected with the main slide-bars $B^2$ by means of brackets $f^6$, Figs. 2, 9, and 22. The sinkers and bits, as shown, are carried by the brackets G at either end, which are supported by blocks $16^a$ on the under side of the needle-beds. The brackets are adapted to have sliding movement in the blocks for adjusting these devices in relation to the needles, and as means for effecting this adjusting movement I employ the shafts $g'$, worms $g^3$, pinion $g^4$, and screws $g^5$, precisely as in Letters Patent No. 291,348, dated October 16, 1888.

The reversible thread-guide feeds first one row of needles and then the other, and is adapted to perform a twofold function besides that of guiding the thread. It is provided with a curved knife-edge, which, as the carrier moves along and feeds the yarn to the advancing needles, will be in position to open any latches which may be closed, and is also adapted to effect a necessary result in the fashioning action—that of shielding the thread from the empty needles when they advance—and for this purpose is bent slightly to one side. The thread is always held on the rear of the guide, it being directed through an opening at the back of said guide, as in Figs. 5 and 6, and when the needles, rendered empty by the transfer-points taking the loops therefrom, are lifted, as hereinafter described, their advancing action to take the thread is rendered ineffectual by reason of the turned portion of the guide guarding the thread therefrom. The mechanism for operating this guide is designed for the purpose of enabling the operator to determine by adjustment the point (in relation to the needles) at which the reversing action shall take place, so that when it is desired to knit a fabric of less diameter than the length of the needle-rows the operator can, by adjusting the stroke and the point of reversing the guide, render the machine capable of knitting without lost motion and without drawing the thread unnecessarily at the end of the stroke.

The carrier H, Figs. 5 to 8, moves on channel-bars $h\ h$, extending longitudinally of the machine and supported by the end frames. Its vertically-arranged spindle $h'$ is supported in the upper and lower cap-pieces 20, and upon the lower screw-threaded end the thread-guide $h^2$ is secured between nuts $h^{73}$, being slotted to embrace the spindle. A sleeve 21 is located within the carrier and about the spindle, and is adapted to move freely up and down, being guided by a piece 22, secured thereto and projecting through a vertical slot 24 in the wall of the carrier. An inclined groove 25 is formed in the sleeve, into which a pin 23 projects, said pin being fixed to the spindle. Obviously, when the sleeve is moved up or down, the inclined slot, acting upon the pin on the spindle, causes the same to assume different lateral positions, and the ends of the slot being opposite the spindle will be given a half-turn and the thread-guide reversed accordingly. Movement is imparted to the sleeve by means of a bar $h^6$, extending from end to end of one of the guide-bars, which is provided with a groove or channel for receiving the stud projecting from the sleeve through the vertical slot in the carriage. When the bar is raised or depressed, its action is imparted directly to the sleeve, spindle, and thread-guide, and as the stud is always in engagement with the bar this action can take place at any desired point without regard to the position of the carrier at that time relative to the ends of the needle-rows. The ends of the bar $h^6$ are inclined and formed with shoulders adapted to bear upon corresponding inclined shoulders on the inner side of the bar $h$. It is raised or lowered by means of a sliding plate $h^3$, supported in the guide-bar and having inclined slots cut therein, which engage with blocks secured to the rear face of the bar $h^6$. The sliding plate $h^3$ is in turn operated by a rod $h^4$ on the outside of the supporting-bars, connection being made between the two by means of brackets 26 extending through slots in the guide-bar. The thread-carrier has secured thereto an arm or abutment 27 in loose engagement with the rod $h^4$. On the rod $h^4$ adjustable stops $h^5$, with buffer-springs $h^{53}$, are secured by means of screw $h^{10}$ drawing the two sides of the stop together. These stops are in position to be struck by the arm on the carrier. When either the one or the other is so struck, the movement of the carrier shifts the rod longitudinally, which actuates the slide-bar and moves the grooved bar $h^6$, which action, through the devices described, reverses the thread-guide either one way or the other, as the case may be. This operation is performed by the arm on the carrier striking the stud of the operating-bar at the final portion of the stroke. The studs on the operating-bar are adjustable, as stated, and by adjusting the stroke of the carrier to feed a greater or less number of needles the thread-guide can be actuated to reverse by setting the studs in position to be struck at the latter end of the stroke without regard to the length thereof. The carrier is driven by a rod $h^9$, which extends to the end of the machine through the upper supporting-frame, where it is connected to a vertical post secured to one of the cross-braces $a$ of the slide-bars.

The reciprocating stroke of the slide-bars and carrier may be varied by changing the crank-pin on the face-wheel, and the only other adjustments necessary to knit with a less number of needles than that employed by the machine are those of the stops $h^5$, above mentioned, and the pins 8 8, Fig. 1, for shifting the stitch-cams. The bar $h^6$ does not move directly up and down, but in a slanting direction, by reason of its ends being inclined. This movement exerts a wedge-like force on the stud of the sleeve and renders the action easy. The inclination of the slots in the sliding plate $h^3$ is at right angles to the inclined shoulders, and a similar wedge-like action is secured here.

The devices for fashioning the fabric are now to be described, and also their operation to produce the narrowing and their action in relation to the knitting devices.

As stated, the knitting goes on continuously and the fashioning action occurs at intervals and simultaneously with the knitting, the two sets of devices performing their several functions independently and without interference. The fashioning operations are put off and on by pattern mechanism, and the movements are controlled by said mechanism also.

The main or cam shaft F of the machine makes one revolution for each movement of the slide-bars in either direction, the gear $e$ and face-plate accomplishing a half-revolution to each complete movement of the main shaft, for which purpose the gear $e$ has twice the number of teeth of the driving-gear $f$. The first movement in the narrowing operation is the advancing of the needles through their loops to leave their eyes exposed for being engaged by the transfer-points, as in Fig. 3. This action occurs just as the slide-bars begin their stroke to the left, Fig. 9, and following the knitting action, and on this stroke and revolution of the shaft the operation of narrowing is performed up to and including the action of moving back the needles and transferring the loops therefrom to the points and holding these in position to be engaged by the needles when they again advance. It will only be necessary to follow out particularly the operation of the narrowing and widening devices for one side of the machine; that for the other side, together with the devices themselves, being similar in all respects, the actions alternating and being independent of each other. The immediate devices for operating the needles forward and backward consist of a shifting cam-plate, R carried by the slide-bar having a groove to receive the needle-heels, Figs. 3, 10, and 13. This groove communicates with the stitch cam-groove and the plate is guided to have slanting movement to thrust the needles forward or backward. As this shifting plate forms the subject-matter of application filed by me in the United States Patent Office on the 29th of February, 1888, Serial No. 265,725, it is necessary to state only that it may be operated either by hand or automatically, and in its forward or backward movement the groove for the needle-heels is kept continuous throughout and of uniform width, as will be seen, Figs. 10 and 13, which together show it in both positions. It is guided by inclined bars 28, secured to the slide-bar, and is supported by plate 29. An operating-bar $C^{10}$ is located in a channel formed in the slide-bar, and is provided with inclined slots $C^{11}$, dotted lines, Figs. 10 and 13, which receive blocks $20^a$, projecting from the switch-plate. Movement of the slide-bar will cause the forward or backward movement of the shifting plate, according to the direction of said movement. For operating the bar manually, a handle 31, Figs. 1, 9, 10, 12, 14, and 26, is secured at its end.

In providing means for the automatic operation of the shifting-plate I aim to secure a varying movement in the needles as they advance and retreat—that is, it is intended that the advancing action, as also the retreating movement, be quickly performed, gradually increasing from the beginning to the end of the forward thrust and decreasing on the backward movement, the acceleration of the advance movement preventing the loops from being strained and the retardation of the return-stroke allowing the transferring of stitches to be better performed. The handle 31 is provided with a notched flange 32, adapted to be engaged by a spring-catch $i'$, carried by a bar $i^2$. The bar is guided in the upper face of the slide-bar and connects with the automatic operating device. This is shown at J, Figs. 3, 5, 10, 11, and 12, and consists of an eccentric disk secured to the slide-bar by pin 34, so as to have rotary movement, and provided with an eccentric or cam groove $j$. In this groove is held a block 33, secured to the forward end of the operating-bar $i^2$. Rotary movement of the disk will cause the plate 33 to be acted upon by the various portions of the groove moving the bar longitudinally and shifting the cam-plate R accordingly. The movement imparted will vary as the plate approaches the center of motion, the variation being a decrease on this stroke, which is toward normal position, the needles all being retracted when the plate is in that portion of the groove near the center. During the time the plate is moving toward the low part 13 of the groove the needles are retracting, the speed decreasing, and at this time, as will hereinafter be described, the transfer-points are advancing to engage the loops. This gradual cessation of the rearward movement in unison with the advance of the transfer-points insures an easy action and prevents the loops from being unduly strained; and the same advantage may be pointed out as arising from the gradual advancing movement, the loops not being subjected to sudden movement or strain when the needles begin their movement. For operating the eccentric disk the upper portion of it is formed into a beveled gear 35, and arranged to mesh with this is a beveled pinion 36, carried by a sleeve 37, which in turn is supported by the shaft 38, being splined thereto. The sleeve has its bearing in a casing $i^3$, secured to the slide-bar, and the shaft 38 is journaled in the cap-pieces $k$, which hold and guide the slide-bars to their bearings on the needle-beds. By this construction the slide-bars carrying the disk, sleeve, and casing can have free reciprocating movement and at the same time maintain always operative connection with the shaft 38 without regard to position. The shaft is provided with a sprocket-wheel $k'$, which, through the medium of the chain $k^3$, Figs. 9, 22, and 26, receives its motion from a sprocket $k^2$, formed on a collar $k^4$ fitted to turn on the stud 39. The chain is directed around suitable lag-pulleys $2^a$. The collar $k^4$ is in engagement, through pin 40, Fig. 26, with a movable sleeve 41 on the stud, the said sleeve carrying a pinion $K^5$. The pinion for the rear side of the machine is marked $K^6$, and is of the same form and relation as pinion $K^5$ for the front side. A wheel K on the cam-shaft of the machine is provided with segmental racks $l\ l'$, the former being designed to actuate the needle-moving devices on the front side of the machine, while the other performs a similar function for the rear side, it being understood that the pinion $K^5$ and its sleeve must be properly shifted and held to engagement with the proper rack $l$ before the parts can be actuated. This shifting of the sleeve and pinion occurs at the end of the stroke to the right and before the left-hand movement begins, and the connections and devices for accomplishing the shifting action are controlled in their operation as to time of performance by the pattern mechanism of the machine. We will suppose the transfer-points are being properly operated to act in conjunction with the needles, and then follow throughout the operation and connections. The shifting sleeves of pinions $K^5$ $K^6$ are in connection with levers L L', the connection being made by a curved shoe on each lever fitted to a groove in the corresponding sleeve. The levers have extensions 42 connected by a spring 63, which tends constantly to draw the extensions together, and thus shift the pinions from engagement with the operating segmental racks $l\ l'$ into normal position. The long arms of the levers are indirectly connected, through bands $l^5\ l^6$, to operating-levers 43 44, Figs. 3 and 26, pivoted to the front lower girt of the machine and extending to the rear and beneath the cam-shaft thereof. The bands are crossed to connect with their respective devices, a coupling $l^{17}$ being provided for this purpose, and are directed around sheaves 46, Figs. 2 and 3, supported upon a plate 47, which is in turn supported by a standard $l^3$, the standard being secured to the bracket $l^4$, held by the rear lower girt of the machine. On the standard at either side bell-crank levers $L^2$ are pivoted, to the upper arms of which the bands are secured. The other arms are in connection with the free ends of the operating-levers 43 44 by means of rods $l^7$, said rods being pivotally connected to both, and each being provided with a turn-buckle for adjustment.

Each operating-lever 43 44 has a long stud on its side, upon which is loosely fitted a laterally-shifting friction-roller $43^a$ $44^a$, Figs. 2, 23, 24, 25, and 26. These rollers form the laterally-shifting part of the levers 43 44, and are designed to be depressed with said levers when shifted into range with the proper cam, as hereinafter described. The effect of this depression of the shifting rollers with their lever is to operate the connections and throw in the proper shifting pinion for the advance and retreat of the needles, and for the purpose of operating them when properly shifted I provide segmental cam-pieces $m$ $m'$, which are mounted on the cams M M' on the shaft F, and are formed to engage with the shifted rollers and thus operate the connections. The shifting of the rollers is accomplished at the proper moment by horizontally-arranged levers $m^2$ $m^3$, Figs. 2 and 26, having pins upon their forward ends which enter grooves in the rollers. These levers are controlled by connections with the pattern mechanism, the object here being, primarily, to reduce the length of the pattern-chain used for a given size of garment. The other arms of the levers are connected by links $m^4$ to oscillating levers $M^3$ $M^4$, loosely fitted to the rear lower girt 8. These levers constantly operate and thus shift the rollers in and out. This oscillating movement is derived from the main shaft of the machine through cam-and-lever mechanism. The immediate actuating-lever N is also loosely fitted to the girt, Fig. 3, and one arm thereof projects upwardly and is provided with a laterally-projecting pin $N^{97}$, which normally is in engagement with the oscillating levers $M^2$ $M^3$. The other arm 50 of the lever is bifurcated at its front end, and embraces a loosely-fitted sleeve carried by another lever N', Fig. 3, pivoted upon the front lower girt. This lever is provided with a friction-roller 51 in line with the central cam $n$ on the main shaft, and is adapted to be depressed when the tappet 52 of the cam engages with the roller, such depression throwing down the front end of the oscillating lever N, and causing its upper end to move forward, carrying with it the upper arms of the oscillating levers, which, through their lower arms, work the bell-crank levers $m^2$ $m^3$ and the shifting rollers. The levers are returned to normal position by springs 53, Figs. 24 and 25, located in the bracket $l^4$, which press against pins 54, abutting against the upper ends of the levers. These levers, it will be seen, oscillate at each revolution of the shaft. It is designed to arrest the movement of the levers alternately when they assume their forward position, so that the roller on the appropriate lever 43 or 44 will be retained in position to be engaged by its cam-segment and shift the pinion $K^5$ or $K^6$, as the case may be, for operating the needles on the front or rear of the machine. This alternating arresting effect is secured through the controlling devices heretofore referred to, the said devices being themselves operated at the proper time by the pattern devices to bring them into suitable position for engaging with the oscillating levers and controlling or arresting their backward movement. These controlling means, Figs. 3 and 26, consist simply of projections $n'$ $n^2$ on a cylinder $N^2$, which receives proper step-by-step motion from a ratchet-wheel $N^3$ and a pawl $n^3$ on the extreme rear end of the lever N', which, as stated, is acted upon at each revolution of the shaft by the tappet on the central cam.

When the knitting is going on plain, and before the pattern mechanism (hereinafter described) operates to set the fashioning devices in communication with the operating parts of the machine, the constant depression and elevating of the pawl-lever N' is not effective so far as the controlling devices are concerned, it operating only to oscillate the levers, for the reason that the pawl $n^3$ at this time works freely up and down upon a long tooth $n^4$, formed on the ratchet-wheel. When, however, as hereinafter described, the pattern-chain is rendered effective by the stud or projection thereon operating upon connections to the cylinder $N^2$, the long tooth of the ratchet carried by the cylinder will be moved downwardly, and the appropriate stop or controlling projection will be brought into the range of the oscillating lever by the first action of the ratchet-pawl, which is now effective, and said lever will be held in its forward position to keep the roller shifted inward and in the path of the segmental cam, the continued movement of which, as the shaft revolves, brings it into engagement with the same, depressing the roller and depressing its supporting-lever, with the result before mentioned—namely, that of shifting the pinion $K^5$ or $K^6$, as the case may be, and causing the advancing and retreating movements of the needles. The forward movement of the oscillating levers $M^3$ $M^4$ occurs simultaneously with the rotary movement of the cylinder $N^2$ to bring the proper stop projection into play, as both actions are secured through the medium of the tappet 52 on the central cam and the lever N'. The cylinder $N^2$ is supported in bearings $N^5$, formed on the rearward extensions of the bracket $l^4$, and to its shaft, near one end, a disk $o$ is secured, provided with a single tooth $o'$, adapted to be engaged by a pawl $o^2$, operated and supported by a lever $o^7$ on the end of the shaft of the cylinder $N^2$ and connected with the pattern devices, as hereinafter described. When the disk and pawl are in normal position, the pawl $n^3$ of the ratchet is working without effect on the long tooth; but when the pawl of the disk is actuated by the pattern mechanism it turns the disk and cylinder sufficiently to throw the pawl $n^3$ over the long tooth, or into engagement with the other ratchet-teeth, which, being equal in length to the stroke of the pawl, are engaged thereby, and movement is imparted to the ratchet and cylinder equal to the space of one tooth with each revolution of the main shaft until the long tooth comes into play again.

It will be seen from Figs. 26 to 28 that the stops or controlling-teeth $n'$ $n^2$ are not in line with each other; but one $n^2$ is placed on the other side of the ratchet and is farther back on the cylinder in line with its corresponding lever, so that only one is brought into action under its lever at a time, the free lever returning to its normal position and throwing the shifting roller on the operating-lever out of range of its segmental cam, thus permitting the advancing and retreating actions of the needles to go on, first on one side and then upon the other. These controlling stop-teeth are located at a distance apart equal to two ratchet-teeth, for the purpose as hereinafter described, and intermediate of these two studs, Fig. 26, at an interval equal the space between the ratchet-teeth, a stud $z$ is positioned, Figs. 24 and 26, out of line with the other two. This is designed to act after the first stud $n'$ on the next revolution of the main shaft, and is intended to control the operating parts to cause the actuation of the transfer-points, which, it will be borne in mind, must act in conjunction with the needles operated through the action of the first stud. A fourth stud $z^2$ is employed positioned farther back on the cylinder out of line with the others and designed to follow the action of its companion stud $n^2$ for the narrowing on the other side of the machine. These studs, their action and relative position will be described hereinafter.

A brake device is employed in connection with the cylinder-shaft to prevent excess of movement and to hold the controlling-stop to its work, this being shown at O and consisting of a band secured to a disk $o^3$, fixed to the girt and passing about a friction-disk $o^4$, secured to the cylinder-shaft.

The pattern-chain is shown at O', Figs. 23 to 26, passing over a sprocket-wheel $o^2$ in the direction of the arrow. The sprocket-wheel is loosely fitted to the front upper girt, and is combined with a ratchet-wheel $o^6$ and pawl $o^5$, the pawl being carried by an arm $o^8$, adapted to oscillate on the girt. The arm is moved sufficiently to turn the ratchet and sprocket wheel the distance of one tooth by means of an eccentric P on the main cam-shaft of the machine and eccentric-rod $p^{19}$. The sprocket-chain is provided at the required intervals with projections $p$, one of which is provided for each two narrowing actions desired, or for each round of knitting. At one side of the sprocket a collar $o^{10}$ is situated on the girt, which is formed with an arm $o^{11}$, having a bearing at its outer end. On this end a lever P' is pivoted, the lower end of which is in connection with the lever of pawl $o^2$, acting upon the single tooth in the disk $o$. The connection is formed through a steel band 54, which passes from the lever over a directing-wheel 56, supported on the rear upper girt. The operation of the pattern mechanism, together with that of the entire controlling devices, will be particularly described hereinafter in connection with the needles and transfer-points.

For holding the pinion-shifting levers L L' into or out of working position—that is, to hold the pinions to or from engagement with their segmental racks—a catch 67, Figs. 9, 26, and 22, is pivotally supported by the bracket 56 between the long arms of the lever. Each end is formed with a notch 57, that for one end being located on the edge opposite to that of the other. They are adapted to receive pins 58 59 on the long arms of the shifting-levers. The normal position of the pins is out of range with the notches, and they are not engaged thereby until the proper operating-lever 43 or 44 has been depressed to throw either one or the other in. The catch, Fig. 22, is oscillated at each revolution of the shaft, and for this purpose the spindle $p'$, upon which it is carried, extends downward through an opening in the bracket, being journaled in an upper plate and having fixed upon its lower end a collar adapted to the opening in the bracket. The collar has a stud 60 on its side projecting into range with an adjustable cam-piece 61, secured to the driving beveled gear $a^3$, Figs. 2 and 22, on the main or cam shaft F. The cam-piece is held by a screw $61^a$, passing through a slot therein, Figs. 1 and 22. At each revolution (in the direction of the arrows, Fig. 22) the cam-piece strikes the projecting stud and turns the spindle, throwing to one side the catch-lever, and if at this moment either of the pinion-shifting levers has been pulled upon by the depression of its corresponding operating-lever 43 or 44 the stud on said shifting-lever will be caught by the appropriate notch on the return movement of the catch, and the pinion will thus be held to operative engagement. The extreme ends of the catch are formed into bearing-faces, and when it has assumed normal position the inoperative lever, as shown in Fig. 26, is held against movement by its pin bearing thereon, it being understood that only one lever is operated at a time. The return of the catch to normal position is effected by a spiral spring 62, located around its spindle, one end being fixed thereto and the other end secured to the upper plate. The cam-piece for moving the catch and the cam-segments $m$ $m'$, carried by the shifting-cams M M', which cause the shifting-levers L L' to operate, are so positioned that the piece comes into action and turns the catch just before the cam-segment comes into play against the shifting roller on the operating-lever 43 or 44, and the cam-piece 61 is long enough so that the catch will be turned aside and held a sufficient time to allow the appropriate shifting-lever to be operated, when the catch will be turned by its spring, and thus engage with the pin on that lever to lock it and hold at the same time the inoperative lever against movement.

Fig. 26 shows clearly the connections from the shifting pinions $K^5$ $K^6$ to the controlling device and pattern mechanism, and the parts are shown in the position assumed by them for the second narrowing action, or that in which the needles are thrown forward on the rear side of the machine, the slide-bar being shown to one side moving from right to left, with the needles on that side properly advanced. The oscillating lever $M^4$ is shown as held by its controlling-stud $n^2$, and the advanced position of the controlling-stop $n'$ for the front side of the machine is also indicated, the fashioning action on that side having at this time been accomplished. Fig. 2 also shows the needles advanced on the rear side of the machine, the cam-segment $m'$ on the shifting-cam M' being in line with the shifted roller on the lever 44, the cam-segment at this time having depressed the roller and risen to the position shown by the revolution of the shaft in the direction of the arrow. The operating-levers 43 and 44 are returned to normal position by the spring 63, connected to the pinion-shifting levers L L' through the intermediate bands, bell-crank levers, and rods, as described. The shifting of the roller on the lever 44 occurs at the middle of the stroke to the right, and its depression by the cam-piece takes place when the right-hand movement of the slide-bars has been completed. During this stroke to the right the pinion $K^6$ is located over the plain portion of the wheel K and out of engagement with the segmental rack. The pinion is provided with a flange 65, which has a portion cut away, as at 66, Fig. 22, on a curve corresponding to the periphery of the wheel K, and when the pinion is disengaged from its rack this portion of it bearing upon the wheel is prevented from turning and unduly affecting the needles, which are now in normal position. The segmental rack $l'$, as also the one $l$, is only long enough to give the required forward and backward movement to the needles, and by the time the stroke to the left has been finished and the needles have completed their first forward and backward movement the end of the rack has passed the pinion $K^6$, which then ceases to revolve, it being on the plain portion of the wheel intermediate of the ends of the rack, and the position of the cut-away portion 66 of the pinion-flange is such that as soon as the end of the rack leaves the pinion this portion passes the groove and bears upon the plain part of the wheel K and holds the pinion against movement. The wheel has peripheral grooves $p^3$ $p^4$ extending beside the rack, which receives the flange as the pinions revolve. The needles at this time have retreated into normal position, and the transfer-points have advanced until their ends are engaging the loops. The next step in the narrowing operation at this time is the transferring of the loops by the lateral movement of the points from one needle to the next, and while this action is taking place the shifting pinion is held against movement on the plain portion of the wheel sufficiently long to allow this action of transferring to be performed, this occurring at the time the left-hand stroke is completed and just at the beginning of the right. As the catch 67 is operated by the cam-piece on the beveled gear $a^3$, this will take place at each revolution of the shaft, and the shifting-lever of the shifting pinion will be released when the stroke of the machine is completed in either direction, being returned to normal position by the spring. The pinion therefore assumes normal position out of line with the rack at the end of each stroke to the left, as well as to the right. The needles having assumed their retracted position and the shifting action having been completed, it is necessary that the needles be again advanced and retracted to take the transferred loops, and thus accomplish the action of fashioning the fabric. This action takes place on the return of the slide-bars from left to right, the needles being thrust forward and back in advance of the thread-carrier and the knitting operation. For this operation the shifting pinion $K^5$ must be immediately again thrown back into line with the rack $l'$ as the right-hand stroke begins, so as to be in position to engage the front end of said rack as it comes around. The cam-piece 61, for operating the catch 67, holds the catch in the position indicated and allows the action of shifting the pinion out and in, and the return of said pinion is effected by the second depression of the lever 44, the roller of which had assumed its outward or normal position, but is again in line with the cam-segment $m'$ on the cam M, this having in the meantime been shifted laterally for causing the devices in connection with the point-block and carriage to be operated, as will hereinafter be described. The relation between the pinions $K^5$ $K^6$ and their racks in respect to the number of teeth is such that they make four revolutions to one turn of the wheel K, and the connections between the said pinions and the respective eccentrics operated thereby are so timed that these four revolutions are required to turn each eccentric once and give to the needles one forward and backward movement. The movement is consequently decreased from the pinion to the needles, and this prevents any excess of movement of the pinion or connections from unduly affecting the needles. The pinions $K^5$ and $K^6$ are located on each side of the bracket 56, and the respective segmental racks on the wheel K are positioned so that the same relation exists between each rack and its pinion—that is to say, the forward end of the rack $l'$ for the rear pinion is located in advance of that for the front pinion, so that each rack and pinion comes into alignment for the shifting action of the latter simultaneously with each revolution of the shaft, one only, however, being shifted at a time, as before stated. These relative positions are shown in Fig. 22, the rack shown being that for the rear pinion $K^6$.

The position of the blank space between the ends of the other rack is indicated by the points $a^9$, and the pinion for this rack at $K^5$. The forward end of each rack is provided with hardened and removable teeth $l^{19}$ to take the wear of the impact when the parts are first engaged. The catch 67 has on its hub a stop-pin 70, which limits its movement by abutting against a plate 71. The bands connected with the pinion-shifting levers are directed around pulleys 72, which are supported on the bracket 56 in such a position that the pull upon the long arms will be at right angles to them.

The transfer-points $Q^x$, Figs. 3, 5, 9, 15, and 16, are held on a supporting-block Q by means of a cap-piece 7, secured by a screw 179. The block is pivotally supported in ears 72 on a plate $Q'$, which has sliding connection with its support $Q^2$, the latter being provided with bearing-surfaces, upon which the edges of the plate rest. The point-carriage $Q^2$ is sustained by the shafts $R'$ $R^2$, extending from end to end of the machine and journaled in the upper frame. The carriage $Q^2$ is arranged so that its bearing-edges will be approximately in line with the row of needles positioned opposite, in order that the movement of the sliding plate and points will be in a line parallel to the forward and backward thrust of the needles. For giving the forward movement to the points, (which is their first action in the fastening operation,) the sliding plate is provided with a rack-bar $q$ on its under side, which is in mesh with a pinion $q'$, Fig. 16, splined to the shaft $R'$, and having its bearings in collars 73, secured to the sides of the point-carriage. When either of the shafts $R'$ is turned in the direction indicated, Fig. 15, the pinion operating on the rack-bar will thrust the transfer-points forward to engage with the advanced needles. To the end of the shaft and within the supporting-frame is fixed a second pinion $q^2$. This pinion derives its motion at the proper moment from a segmental rack $r^3$ on the upper end of a lever $q^3$, which is loosely fitted to the upper girt of the machine. A similar rack-lever $q^3$ and pinion are employed for operating the shaft $R'$ on the other side of the machine. The horizontal arms $q^4$, Figs. 3 and 15, of these levers extend over the cam-shaft to near the opposite side of the machine, and are provided with friction-rollers 76 77, Fig. 3, adapted to be engaged by cams $r$ $r'$, Figs. 2, 3 and 28, on the main shaft. When the horizontal arm $q^4$, which is for the front of the machine, is elevated, as shown in dotted lines, Fig. 3, by its cam $r$, Figs. 2 and 28, the segmental rack $r^3$ will actuate the pinion, turning the shaft and throwing forward the points on the front side of the machine, as shown in Fig. 3. A similar action respecting the rear point-block takes place when its operating devices are actuated by the cam $r'$; but these actions are not simultaneous. The levers and arms are made in two parts connected adjustably, as at 78, Figs. 3 and 15, by means of a screw passing through a slot, jam-screws $78^a$ being used to hold said screws in place.

The forward movement of the sliding plate has an additional effect upon the points, besides giving them their advancing action—namely, that of elevating their forward ends slightly from their normal position, so that the forward movement will carry them over the hooks and eyes of the advanced needles. The normal position of the points when retracted is down, so as to be out of the range of the thread-guide. The pivoted point-block is provided with a rearwardly-extending arm, at the end of which is fixed a transverse pin adapted to bear on shoulders 79, Figs. 5 and 15, formed on arms $r^{31}$ on either side of the point-carriage, the said arms having a bearing 80 at their ends splined to a third shaft $R^3$, journaled in the extreme outer portion of the upper frame A A'. The shoulders have inclines 81, and in front of these inclines the arms are formed with inwardly-projecting flanges 82, and as the sliding plate moves forward the pins bearing on the shoulders, through the pressure exerted by spring $81^a$, Figs. 3, 5, and 9, will be directed down the incline by engagement with the flanges, and the arm 73 will be depressed, elevating the front end of the point-block as it moves forward, and raising the points, so that at this part of the movement the points will have assumed a position directly over the hooks and eyes of the advanced needles. Having assumed proper position, the next movement in order is their depression, and this is effected by means of the arms $r^{31}$, which are tilted at the proper time, thus raising the arm 73 and throwing the points into engagement with the advanced needles covering their hooks. The shaft $R^3$ at the front of the machine is provided near its end with arm $80^a$, secured thereto, which is in connection, by means of rod $81^a$, with a lever 85, the end only of which is shown on the left in Fig. 3. This extends under the cam-shaft, and is pivotally supported by the rear girt. The lever 86, connected with the shaft $R^3$ of the rear of the machine, is pivoted on the front lower girt, as represented in Fig. 3. These levers have friction-rollers adapted to the cams 89 90, Fig. 28, respectively, and when either one or the other of the levers is depressed by its cam the connections will be pulled upon, the shaft R³ turned, and the arm tilted to depress the transfer-points, as shown on the left of Fig. 3, which is the front of the machine. This causes the points to engage with the needles. After the engagement of the points and needles the longitudinal movement is continued, the needles retracting and the points advancing until the loops are on the transfer-points, at which time the needles are stationary, and are held so by the disengagement of the shifting pinion and its segmental rack, heretofore described, until the transferring action takes place. For this operation the transfer-points must be elevated to raise the loops to be shifted laterally from one needle to the next. For this the continued revolution of the main shaft brings the low part of the operating-cam 89, for example, into engagement with the roller, which allows the spring 91, Fig. 3, to exert its force, thus by reverse movement raising the lever and the transfer-points through the connections described.

The shifting of the points laterally requires accurate and certain movement, and for this certainty and accuracy I have provided a positive mechanism which moves and controls the point-carriage. Further, in order to relieve the points from any variation of movement due to strain or wear and looseness in the connections, I have provided means whereby the impelling mechanism for the points is brought to bear more directly thereupon.

The mechanism directly in connection with the point-carriages consists of a pair of threaded shafts $R^2$, which work in nuts $r^5$, fixed to each side of the carriage. These screw-threaded shafts on both sides of the machine are moved simultaneously by the chain 92, Figs. 3, 5, and 9, passing over sprocket-wheels 93 on the ends of the shafts $R^2$. The chain is driven by a sprocket-wheel S, carried upon a shaft 91, which has its bearings on the central vertical line of the machine, Figs. 3, 5, 19, and 21, being held by the frame and a supporting-sleeve 92. Secured to the outside of the shaft is a toothed disk 93, the notches of which are adapted to be engaged by a spring-actuated pawl 94, carried by a movable arm s, fitted loosely on the shaft. Movement of the arm when its pawl is in engagement with the toothed disk will cause the rotation of the shaft, which, through the sprocket-wheels and chain, will impart said motion to the screw-shafts. The pawl-arm s is moved at the proper time from a lever $s'$, the connection thereto being made by a band $s^2$. The lever is provided with a friction-roller, Figs. 2, 19, and 28, which ordinarily bears upon the concentric portion of a disk $s^3$. This disk has formed thereon a cam-shaped abutment $s^4$, connected thereto by means of a grooved web, above the face of which abutment the roller passes when resting on the disk and in normal position, and is not affected by the cam-abutment. When, however, the roller is removed slightly from the face of the wheel, it rides over the abutment-face, and the lever is thereby operated to the full extent required. The lever is fixed to a shaft $s^5$, which is journaled in hangers depending from the front lower girt of the machine, and on this shaft are fixed levers 93, extending inward and beneath the cam-shaft. Friction-rollers on these levers are adapted to be engaged by shifting cams 95 96 on the shaft when either one or the other is in line, and thus at the proper moment the lever $s'$ is depressed and the friction-roller moved into the path described by the abutment, thus causing the depression of the lever $s'$ and the pull upon the connections necessary to move the screw-shafts for the shifting action of the points.

It will be understood that the levers 93 both have the same effect when either is operated—namely, that of moving the screws simultaneously and through the described connections; but said levers are actuated independently and alternately and by the separate shifting-cams 95 and 96, one being intended to act in conjunction with the actuating devices for the front point-carriage, and the other with those intended for the carriage at the rear of the machine. The shifting-cams 95 and 96 determine the times at which the screw-shafts shall operate the point-blocks laterally by throwing the roller on the lever $s'$ into the path of the cam-abutment $s^4$. The cam-abutment completes the movement of the lever $s'$ and insures the accuracy of this movement, as it works upon the lever close to the point of resistance, or the point at which the bands are attached, and there is thus no liability of any movement being lost, as might be the case were the shifting-cams 95 and 96 employed to give the whole movement through the levers 93 and 94, shaft $s^5$, and lever $s'$, these connections being liable to strain or twist under the resistance of the screws. The connections from the operating-lever $s'$ are so timed in their movement that one depression thereof imparts a quarter-turn to the screws. In the present machine let it be supposed that the needles are located one-fourteenth of an inch apart from center to center, which therefore represents the distance it is necessary to laterally shift the points, and it is further to be understood that this lateral shifting on one side necessarily follows that on the other. The pitch of the screws is such that this quarter-turn would under normal conditions move the transfer-points one twenty-eighth of an inch, or half-way from one needle to the next; but the action of the screws alone would advance the points on both sides—on one side one-half the required distance and on the other a one-half distance not required. On one side, therefore, of the machine the quarter-turn of the screw is increased in movement, while upon the other side the movement of the screw is rendered ineffective by equal longitudinal movement of the screws in opposite directions. Both screws for the action just mentioned are given the longitudinal movement concurrently with their rotation and in opposite directions, and on each side this movement equals one twenty-eighth of an inch. On the side which is effective at this time the longitudinal movement is in the direction of the points' movement or travel on the screw, and thus the point-carriage, which by the quarter-turn of the screw is shifted half of the required distance, is given the remaining movement by the longitudinal movement of the screw-shaft, the completion of which brings the points, with the loops thereon, to the next needle, ready for the completion of the transferring of the stitches on the next advance of the needles. During this action the screw on the other side of the machine has moved longitudinally one twenty-eighth of an inch backward, or in the direction opposite to the travel of the block on the screw, and the effect of the one-fourth turn of the screw is lost upon the point-block, which remains in position opposite the needles until the next narrowing action will be performed, when the quarter-turn, together with the return longitudinal movement of its screw, will render the action here effective for the transferring on this side, the screw upon the side first mentioned moving back longitudinally, so that its action is lost in turn. For accomplishing this longitudinal movement of the screws, I have provided their reduced ends with thimbles $t$ $t'$, secured thereto, located within the bearings in the frame $A'$, Figs. 9, 16, and 17. In these thimbles zigzag grooves are cut, forming inclined or cam faces, (of which there are four each,) being located a quarter-turn from one another, being cut to move the shaft to and fro one twenty-eighth of an inch. Screw-threaded pins $t^2$ project through the bearings, and upon their lower ends they are provided with friction-rollers $t^3$, Figs. 16 and 17, entering the zigzag grooves in the sleeve. Referring to Fig. 9, the thimbles are so set on their respective shafts in relation to each other that the high part of the groove in one $t$ is engaged by its friction-roller, while the low part in the other is adjacent to its roller. Now, supposing the shaft to make one-fourth turn in the direction of the arrow, Fig. 9, this action of the front side of the machine will cause the low part of the groove to be brought to its roller on the stationary pin, and thus the shaft will be moved longitudinally to the left, and the direction and pitch of the threads is such that the point-carrier will be moved along the screw toward the left also, the sum of these actions, as before stated, shifting the blocks the required distance, or into accurate position before the next needles. On the rear of the machine the same movement causes the inner or high part to come into play, thrusting the shaft toward the right, and this movement being equal to the distance the point-block is traveling on the screw by the latter quarter-turn the points will be kept in position. On the next quarter-turn, the transferring being performed on the other side of the machine, the actions of the screws just given will be reversed in an obvious manner, the front block remaining stationary, while the rear one moves.

It will be understood that the connections to the screws or the threads thereon can be varied to secure any desired movement of the point-blocks, for which also the cam-grooves may be cut to give the necessary thrust. These variations render possible the application of the principle involved to suit different gages of needles, it being apparent that the gist of this portion of my invention consists in imparting to the screw a longitudinal movement concurrently with its rotary motion. During this shifting action the carrier, with the transfer-points, is elevated, and when the lateral movement of the points has been completed the continued revolution of the shaft brings another high part on the cam 89 (or 90) into action, thus causing their depression, and consequently the proper placing of the loops, ready for the second advance of the needles to take them, which action is the next following, being performed by the re-shifting of the pinion $K^6$ into engagement with its segmental rack a second time, and the consequent actuation of the eccentrics on the slide-bars. As the needles again advance, the transfer-points disengage therefrom and retract into normal position. These actions are caused by the springs 91 and $91^a$, Fig. 3. The spring 91 pulls up the lever 85 at the proper moment when the low part of the cam engaging the roller comes into play, and this depresses the arms $r^3$ and elevates the front end of the point-block and transfer-points. The upward movement of the lever is limited by an adjusting-screw in an arm $94^a$, secured to the lower girt of the machine, Fig. 28. The spring and stop device is duplicated for the other end of the machine, as shown also in Figs. 3 and 28, the screw and stop-arm being marked $95^a$. The return of the sliding plate $Q'$ to normal position, and the consequent retraction of the transfer-points, is effected by means of springs, as at $92^a$, Fig. 3, the one shown being for the rear point-carriage. These springs are connected to the free ends of the levers $q^3$ $q^6$, which carry the segmental racks for operating the sliding plate forward and backward through the pinions and shaft described. The other ends of said springs are connected to collars on the lower girt, and thus exert a constant force to return and hold the transfer-points retracted. The round position of the levers is determined by means of adjusting-screws 97 in the ends of arms 98, Fig. 3. The connection between the shafts $R'$ and $R^3$, which, respectively, act to advance and retract and raise and depress the points and the devices which aid in these actions— i. e., the pinion $q'$ and arms $r^3$—is such that the point-carriage can be shifted laterally to any position along said shafts, and the operations of the points can be effected through the same means, the pinion and arm being splined to their shafts, as shown in Figs. 15 and 16.

The cams $r\ r'$, for operating the transfer-points forward and backward, are provided with points 95, Fig. 3, which come into play against the operating-levers at the time the points have advanced, taking the loops and elevating them, and by their engagement with the said operating-levers the transfer-points are given a slight additional thrust forward to insure the hold on the loops and the retention of the same thereon. The described movements of the transfer-points are all effected from the main shaft of the machine by the various cams heretofore mentioned, located thereon, there being a separate set for the points on each side of the machine, and each set being capable of action by the corresponding operating-levers independently of the operation of the other set, the actions following each other.

The action of the parts to fashion the fabric begins, as stated, on the stroke from right to left of the needle-bars, and the completion thereof is effected on the return-stroke, so that one round of knitting is accomplished concurrently with the transferring action. The fashioning can be effected for any desired round or number of rounds of knitting, and the narrowing action may be regulated, respecting time of occurrence and the number of consecutive actions, by properly positioning the projections on the pattern-chain.

The movements of the transfer-point mechanism are controlled and the time of their operation determined by the pattern mechanism and the controlling devices already described. Each set of operating-cams (marked collectively X Y, Figs. 2 and 28) is carried by a spline $x$ or $y$, adapted to move longitudinally of the shaft, and thus shift the cams to and from the normal position, as indicated in Fig. 2, and when either is so shifted the various cams of that set are in line with the appropriate operating-levers for actuating the point-carriage and mechanism connected therewith, the other set being out of alignment with its corresponding levers and having no operative effect thereon. The two sets of cams are held normally by pull-springs 99. The cams on the side X for operating the points on the front of the machine are secured to the spline, which has upon its inner end the cam M, said cam being provided with a flange having inclines $w$ formed therein. The other spline $y$ has a similar cam $M'$ secured thereto, and the arrangement is such that to bring either set of cams into alignment with the rollers on the operating-levers they must be shifted inwardly toward the center of the machine by the movement of the corresponding cam M or $M'$ away therefrom. The edges of the cams last mentioned are in range with constantly-reciprocating pins U U', Figs. 3 and 28, in the bracket $l^4$, each of which is independently actuated and controlled in its movement, as will hereinafter be described.

The forward thrust of the pins occurs at the moment the inclined edges of the shifting cams M $M'$ are brought before them, and this being at each revolution of the main shaft, or twice for every round of knitting, and ordinarily when the knitting is going on without the fashioning operation being performed, the pins are allowed to move backwardly before the inclines on the cams are brought into engagement therewith, this rearward movement being due to the inaction of the controlling devices, the action of the springs 100 in the bracket pressing them back. Should, however, either of the reciprocating pins be held in its forward position, the continued revolution of the shifting cam will cause the incline thereon to engage with the pin, resulting in the lateral movement of the cam along the shaft, and consequently the shifting of all the cams of that set into alignment with the rollers of the operating-levers on that side, with the result above given of operating the transfer-points. The pins are moved forward by the oscillating levers $v\ v$ in a manner similar to that already described in connection with the levers $M^3\ M^4$, for causing the needle advancing and retracting devices to act—that is to say, the levers are operated at each revolution of the shaft by the actuating-lever N, which, by means of the transverse pin carried thereby, moves forward the upper ends of the levers to thrust the pins U U' forward against the force of their springs. It will be remembered that this lever is in turn operated by the depression of another lever $N'$, Fig. 3, each time the revolution of the shaft brings the tappet 52 of the central cam into action. The movement of these oscillating levers is controlled by the pattern mechanism and the intermediate controlling device, heretofore described, and the action of either one of these levers—that is, the action to render the corresponding reciprocating pin operative—follows this of the other companion oscillating lever $M^3$ or $M^4$, the needles operated by which, through the described connection, must act in conjunction with the transfer-points operated by the actuating-lever $v$ or $v'$, as the case may be. The oscillating levers $M^3$ and $v'$ to the right cause the devices to be operated to perform the narrowing action on the rear of the machine when they are properly controlled, while those ($M^4$ and $v$) on the left perform the same function for the front side. The first lever to be arrested in its oscillation to cause the movement of the proper cam to be effective is the one marked $M^3$, which, when controlled in its movement, holds the shifting roller on the operating-lever 43 in line with the segmental cam, effecting, as has been seen, the advance and retraction of the needles on the front. The controlling-stud $n'$, which arrests this lever, is set in advance on the cylinder, as in Fig. 26, and the next in order is the stop $z$ for the lever $v'$. The devices of the rear side of the machine operated by these two adjacent or companion levers having to operate in conjunction with each other, as stated, this stop $z$ is positioned in line with the end of its lever and a distance to the rear of its companion stop $n'$ equal to that between the teeth on the ratchet-wheel $N^3$, which moves the cylinder step by step a distance of one tooth for each revolution of the main shaft, when the pattern mechanism, through its studs, comes into effective action. The next stud $n^2$ on the cylinder is also positioned a distance of one tooth to the rear, and is designed for the lever $M^4$ on the extreme left for operating the needles on the rear of the machine, and in rear of this again at the same interval occurs the last stop $z^2$, Fig. 28, adapted to control the companion lever $v$ for operating the points on the front of the machine.

It will be seen from the above that when the pull-pawl is rendered effective on the ratchet by the long tooth thereon being turned down the revolutions of the main shaft will bring into action the controlling-studs $n'$, $z$, $n^2$, and $z^2$ successively in the order named, one stud being made effective for each revolution of said shaft, and the actions of narrowing first on the front and then on the rear of the machine will be carried on without interruption until the controlling-cylinder is completely turned. It will be apparent, also, that the pattern mechanism (which represents any kind suitable for the purpose) performs only the office of determining the time that the controlling device shall be set in action and the number of times this action shall be repeated relative to the number of rounds of knitting that the fabric is to contain, and also of regulating the interval between each complete narrowing action of the machine which comprises the operations on both sides.

Fig. 23 represents in normal position or inactive the controlling devices and the mechanism acted upon by them. In this position the knitting is plain. The pawl $o^2$ of the single-toothed disk $o$ is in engagement with the said tooth, and the pull-pawl $n^3$ of the ratchet $N^3$ works idly upon the long tooth at each revolution of the main shaft. The pattern-chain, moving in the direction of the arrow, throws back, by means of the stud $p^3$, the upper arm of the lever $P'$, drawing upon the connecting-band and causing the pawl $o^2$ to turn the disk $o$, with its cylinder, to move the long tooth of the ratchet down and away from the pawl-tooth, which then engages with the regular teeth. The continued movement of the shaft F brings the tappet 52 on the central cam into action against the roller of lever $N'$, depressing the same, which, through the pull-pawl, moves the cylinder one step in advance. Simultaneously with this movement of the controlling-cylinder occurs the action of the supplemental lever N, by reason of its being operated by the pawl-lever $N'$, as described, and this movement of the supplemental lever at once throws forward all the oscillating levers simultaneously with the positive rotation of the controlling-cylinder. This first movement of the cylinder brings into proper position the first controlling-stud $n'$, Fig. 24, and the corresponding lever $M^3$ of this pin is arrested and retained in its forward position by said stud, as in Figs. 24 and 25, when the continued revolution of the shaft frees the tappet 52 from the roller 51 of lever $N'$, allowing said lever to rise and thrust backward the upper arm of the supplemental lever, the springs in the bracket $l^4$ then acting and forcing all the oscillating levers (excepting the one held) to normal position. The forward position of the lever holds the shifting roller on lever 43 in line with the cam-segment $m$, and the relation of the tappet 52 on the central cam to the stroke of the machine is such that the shifting of the roller occurs at about the middle of the right-hand stroke. Further rotation of the shaft causes the engagement of the cam-segment $m$ with this roller, and this cam is timed to act after the completion of the stroke named, thus throwing into operative engagement the shifting pinion $k^5$ with its segmental rack and causing the needles on the front of the machine to advance and retract, as described, on the stroke to the left. The position of the parts for this action is indicated in Fig. 25.

The next step in the transferring operation after the advance of the needles—this being the advance of the points and the various other movements thereof—is secured by the continued rotation of the shaft F, which brings a second time the tappet into engagement with the roller of pawl-lever $N'$, this also occurring at the middle of the stroke, but on that to the left. As previously stated, the side incline on the shifting cam $M'$ is located about a quarter-turn to the rear relatively to the position of the tappet, and when the tappet acts a second time to depress the lever $N'$ the incline will be directly opposite the shifting spring-pin $U'$, and the forward movement of this pin occurring simultaneously with the depressing of the pawl-lever, through the connection already referred to, brings the pin into alignment with the incline, and at this instant the second controlling-stud $z$ has been brought into position under the lever $v'$ by the next partial turn of the cylinder, and the pin is held in its forward position long enough to engage with the incline and effect the shifting of the cam $M'$ with the entire set of cams Y, the result of which has been described in detail, the cams being brought into alignment with the various operating-levers, which through the given connections cause the transfer-points on the rear to perform their several functions.

It will be remembered that by reason of the catch 67 being operated at each revolution of the shaft and at the end of each stroke the shifting-lever L and its pinion K⁵ will be released when the left-hand stroke is completed, and it being essential to the proper carrying out of the narrowing action that the needles be advanced and retracted a second time on the return-stroke to the right, it is of course necessary to shift the pinion immediately back to its position of engagement with the segmental rack. This effect is secured by the same connections to the operating parts which cause the first action. On the second revolution of the shaft, or that in which the tappet 52 acts the second time, (as above explained,) the movement of the controlling-cylinder resulting therefrom advances the stud $n'$ beyond the end of the lever M³, and when the arresting of the companion lever $v'$ has been accomplished to shift the cams for operating the points and the tappet has passed on the return of the lever M³ to normal position allows the shifting roller on lever 43 to assume normal position, so as to be again in range with the cam-segment $m$ on the cam M', which at this time has itself been shifted for bringing both the other cams of the set into operative position. The roller and cam-segment $m$ engage at the end of the left-hand stroke, it being borne in mind that the cam-shaft makes a complete revolution while the slide-bars are moving from right to left, or the reverse, so that the throwing in of the shifting pinion occurs in the same relation to the stroke of the machine at both ends. The transferring devices begin their action at about the middle of the left-hand stroke and finish at the same point in the return-stroke to the right.

The operations just described relate particularly to the transferring on the front side of the machine. As this is finished at the center of the stroke, the tappet 52 is again brought into action, and the third stud $n^2$ and its corresponding lever act in conjunction, as in Fig. 26, and the parts are set for the advancing and retarding movement of the needles on the rear of the machine—that is, the roller on lever 44 is thrown in ready for engagement by cam $m'$. The action of the companion lever $v$ for the front transfer-points follows in an obvious manner, and the relative positions of the parts at this time are shown in Figs. 3 and 28. On the completion of the stroke to the right the catch 67, operated, as stated, by the cam-piece on the bevel gear-wheel, and the shifting-lever, with its pinion, is released and allowed to return to normal position, the latter being now disengaged from the rack and locked immovably on the plain portion of the wheel K, in which position it remains until the pinion for the other side of the machine works and until the next stud occurs on the pattern-chain.

It will be understood that by varying the number of teeth in the ratchet and the controlling-studs on the cylinder a greater or less number of successive actions may be secured to have the fashioning performed for any desired number of rounds, it being clear that the reduction to practice of the fundamental principle of this portion of my invention only requires that a supplemental pattern device or controlling means, properly constructed and timed to the movements of the machine, be interposed between the pattern mechanism proper and the operating devices of the machine, which, when operated by the said pattern mechanism, will itself perform the office of controlling the action alone and entirely independent of the pattern device. In the present machine the arrangement is such that two narrowing actions take place for each four rounds of knitting, the cylinder N² being provided for this purpose with two sets of controlling-stops (one set for each narrowing action) and making one complete turn for four reciprocations of the slide-bars or four rounds of knitting, bringing the stops into action successively. Four reciprocations of the slide-bars give the four rounds of knitting and require eight revolutions of the main shaft, as previously stated. As the ratchet is operated step by step for each revolution of said shaft, and as it must make a complete turn for each four rounds of knitting, or eight revolutions of the main shaft to cause the two narrowing actions, it is in the present machine provided with eight teeth, and when the complete revolution of the cylinder has been effected and the narrowing actions on both sides of the machine performed the long tooth is in position to prevent the pawl from having further operative effect, the parts remaining in this position and the knitting going on plain until another stud on the pattern-chain is brought into action, when the cylinder, with its stops, will again be rendered effective and the fashioning actions repeated.

When in the narrowing operation the loop is removed from the needle holding it by the transfer-point, it becomes essential that this empty needle be raised out of its normal position and prevented from taking the yarn as the thread-carrier moves by it. A portion of this effect is secured by the lifting of the needle, so that its thrust will be out of the normal line, and the peculiar form of thread-guide, acting in conjunction with the raised needles, completes the action and insures the ineffective operation of the needles.

For the purpose of elevating the empty needles, as described, at the proper moment, a lifting-bar 102 is employed, Figs. 2, 3, 5, and 9, located at the inner upper edge of the needle-bed. The bed has a shoulder, which supports the lifting-bar, and in front of this a plate 104 is secured. The lifting-bar is further held and guided by clips 105 engaging the upper edge thereof. Immediately in rear of the lifting-bar a boxing 106 is positioned. Extending longitudinally of the machine and within the boxing is a screw-shaft R⁴, journaled in bearings secured to the needle-bed.

The screw is similar in all respects to the screw-shaft on the opposite side of the machine for shifting the point-carriage laterally, and, like said shaft, is provided with a thimble 107 at its reduced bearing end, the latter having a zigzag groove of the same size and form and similarly positioned to the thimble on the screw-shaft of the point-carriage, as in Fig. 9. The connection between the lifting-bar and its operating screw-shaft $R^4$ is made by means of a nut 108, adapted to travel in the boxing and secured to the bar by screws. The bar is provided with a finger 109, the end of which is inclined, and the upper edge of this finger is just a little above the adjacent edge of the needle-bed upon which the needles rest, so that in the movement of the bar the beveled end of the finger engaging the needles causes them to be raised to the upper edge of the finger, and the movement here is sufficient to cause the necessary elevation of the front end in order to render the needle inoperative and cause it to pass over the upper face of the thread-guide and out of position to take the thread, as shown on the left of Fig. 5. The plain part of the elevating-bar rests upon the operative needles and holds them to work properly. Devices similar to these just mentioned are located on the other side of the machine for the same purpose on the opposite row of needles, the only difference being that the thimble is positioned so that the zigzag groove therein alternates in its action with the first-mentioned screw $R^4$ and with reverse effects. The action of these screws and cam-thimbles need not be particularly referred to, it being only necessary to state that they partake of the same peculiarity in their effect upon the movements of the bars as those described in connection with the point-carriage-operating screws—that is, each screw has longitudinal movement concurrent with the rotary motion and in opposite direction—so that the effect of the rotary movement on one side is entirely taken up to keep the nut and lifting-bar immovable, while that upon the other side is added to accomplish fully the movement from one needle to the next.

As shown in Fig. 9, the arrangement is such that the point-carriage screw on one side is effectively operated simultaneously with the screw for moving the needle-lifting bar on the other side, and by this as soon as the transfer-points have taken the loop from the needle and as they shift to the next needle the lifting-bar is moved and the empty needle thrown out. The screw-shafts $R^4$ are also provided with sprocket-wheels $R^{41}$, of the same size and number of teeth as those on the point-carrier screw-shafts, and the same chain connects them all, as in Figs. 3, 5, and 9.

The process of fashioning the garment by widening can be carried on in the same machine without any change in any of the operating parts described, it being only necessary to reverse the movement of the screw-shafts in order that the point-carriers and the needle-elevating bars may be moved step by step to the right, instead of to the left, and for the purpose of fashioning the garment by widening a second spring-actuated pawl $u$ is provided, carried upon the shaft 91 by an arm $u'$, the position being on the side opposite to the pawl for narrowing, so that it turns the disk 93 in the other direction, and through the chain moves the screws to cause the point-carriage to travel step by step from left to right.

In widening the fabric the same action respecting the alternate effective action of the screws is secured, as described above. The pawl for causing the widening action is also connected with the lever $s'$ by a band $u^2$, the connection of both bands to the lever permitting adjustment by screw-pins $u^4$, as in Fig. 19, to get accurate movement of the screw-shafts $R^2 R^4$. Both of the pawls are supported and work in posts $u^3$, carried by the operating-arms, and the arrangement is such that either pawl can be disengaged while the other is acting. The upper ends of the posts are provided with notches, and the pawls are provided with finger-pieces and laterally-extending pins $v''$. When the pawls are in normal position, these pins rest in the notches $v^6$, which are of such depth as will permit the pawl to engage the ratchet. To render either one or the other pawl inactive, it is raised and turned until its lateral pin registers with a notch of slight depth, into which it falls when released, and is held with its lower end above the edge of the toothed disk. The pawls are held and returned to normal position by means of springs $v^2$, connected to the operating-arms and to a post $v^3$ on the supporting-sleeve.

I do not claim, specifically, in this application the switch-cam, the driving mechanism, the sinker-bed adjustment, the knitting devices consisting of the needles, the movable sinkers, and the movable knockover-bits, nor the method of knitting, as pending applications and Patent No. 391,348, all particularly referred to herein, include specific claims for these devices and methods.

I claim as my invention—

1. In combination with the slide-bar, a shifting cam-plate for the transfer movement of the needles, a handle for the said cam-plate, a main shaft and operating mechanism therefrom to the cam-plate, and a detachable connection between said mechanism and the cam-plate, whereby said plate may be operated automatically or disconnected for hand operation, substantially as described.

2. In combination with the slide-bar, a shifting cam-plate for the transfer movement of the needles, an eccentric or cam in connection with the shifting plate for giving a varying movement thereto in advancing and retracting, a main shaft, and positively-operating connections independent of the slide-bar to the eccentric or cam for imparting the movement of the shaft thereto, substantially as described.

3. In combination with the slide-bar, a shifting cam-plate, a rotating disk having an eccentric groove, an operating-bar, one end of which is in connection with the shifting cam-plate and the other with the walls of the eccentric groove, a main shaft, mechanism for operating the slide-bar, and mechanism for rotating the disk operated from the main shaft independent of the slide-bar, substantially as described.

4. In combination with the slide-bar, a shifting cam-plate, a main shaft, a revolving shaft 38, operating connections from said shaft to the main shaft, an eccentric disk and operating connections therefrom carried on the slide-bar splined to and operated from the shaft 38, and operating connections between the eccentric and shifting cam-plate, substantially as described.

5. In combination with the slide-bar, a shifting cam-plate, an eccentric or cam for operating the shifting cam-plate carried on the slide-bar, a shaft 38, for operating the eccentric or cam having a splined connection therewith, a rack and pinion in shifting relation to each other, connections therefrom to the shaft 38, a main shaft for operating the rack, and intermediate mechanism between the main shaft and the rack and pinion for shifting them into or out of engagement, and pattern mechanism for controlling said connections, substantially as described.

6. In combination, the needles, the slide-bar, the shifting cam-plate, an eccentric disk and connections therefrom to the said cam-plate, the said disk being supported on the slide-bar, a shaft 38, extending parallel with said slide-bar, connections from the shaft to the disk, a driving-shaft, and operating connections between the shaft 38 and the said driving-shaft, substantially as described.

7. In combination, the needles, the slide-bar, a shifting cam-plate, an eccentric disk carried in the slide-bar, a connection between the disk and shifting cam-plate, consisting of the reciprocating bar $i^2$ and sliding plate $C^{10}$, the shaft 38, for rotating the eccentric disk having a sliding connection therewith, a rack and pinion, and an operating-chain therefrom to the shaft 38, substantially as described.

8. In combination, the needles, the slide-bar, a shifting cam-plate, an eccentric disk carried on the slide-bar, and a detachable connection between the disk and shifting cam-plate, consisting of the reciprocating bar $i^2$, the sliding plate $C^{10}$, the handle 31, and the locking-catch $i'$, the shaft 38, having sliding connection with the eccentric, a main shaft, and operating connections to the shaft 38, substantially as described.

9. In combination, the needles, the slide-bar, a shifting cam-plate, an eccentric disk carried on the slide-bar, connections between said disk and the shifting cam-plate, a shaft 38, extending parallel to the slide-bar, a gear splined on said shaft, and a gear on the opposite face of the eccentric disk meshing with the gear on the shaft 38, a main shaft, and connections to the shaft 38, substantially as described.

10. In combination, the needles, the slide-bar, a shifting cam-plate, a sliding plate for operating the same, an eccentric disk carried on the slide-bar, a reciprocating bar $i^2$ between the disk and sliding plate, a beveled gear on the opposite face of the disk, a shaft 38, a sleeve splined thereto carrying a beveled gear meshing with the teeth of the gear on the disk, a rack and pinion, and a driving-chain therefrom to the shaft 38, substantially as described.

11. In combination, the slide-bar, a shifting cam-plate, a main shaft, a rack operated directly thereby in the direction of its length, a shifting pinion engaging said rack and operated by the movement thereof, a shaft 38, connections between said shaft and the shifting pinion, and operating devices between said shaft and the shifting cam-plate, a lever 43, connections from said lever to the pinion, a cam on the main shaft, a shifting roller on the lever 43, adapted to be operated by said cam, and pattern mechanism for controlling the movement of the shifting roller, substantially as described.

12. In combination, the slide-bar, a shifting cam-plate, a main shaft, a rack and pinion in shifting relation to each other, a shaft 38, a connection between said shaft and the pinion, and operating devices between said shaft and the shifting cam-plate, a lever 43, a cam on the main shaft for operating said lever, connections between said lever 43 and the pinion, a pattern mechanism for controlling the action of the lever 43, a locking-catch for holding the rack and pinion into or out of engagement, and means for actuating the catch, substantially as described.

13. In combination, the slide-bars, shifting cam-plates, a main shaft, racks operated directly thereby, a pair of shifting pinions engaging said racks, intermediate operating devices between said shifting pinions and the shifting cam-plates, including the shafts 38, levers 43 44, connections from said levers to the shifting pinions, cams on the main shaft for operating said levers, a pattern mechanism for controlling the action of said levers, a locking-catch for holding one pinion out of engagement and the other pinion into engagement with the racks, and means for actuating the catch, substantially as described.

14. In combination, the slide-bar, a shifting cam-plate, a main shaft, a rack operated directly thereby, a shifting pinion for engaging said rack, a shaft 38, and connections from said shaft to the shifting pinion and to the shifting cam-plate, a lever 43, a cam on the main shaft for operating said lever, connections from said lever to the shifting pinion, pattern mechanism for controlling the operation of the lever 43, a locking-catch 67, mounted on the spindle $p'$ under spring tension, a projection on the lower end of said spindle, and a cam in the path of the projection for operating the catch, substantially as described.

15. In combination, the slide-bar, the shifting cam-plate, a main shaft, a rack operated directly thereby, a shifting pinion engaging the rack, a shaft 38 and connections from said shaft to the shifting pinion and to the shifting cam-plate, a lever L in connection with the pinion for engaging or disengaging the same with the rack, a lever 43, a cam on the shaft for operating said lever, operating connections between said lever and the shifting-lever L, and pattern mechanism for controlling the operation of the lever 43, substantially as described.

16. In combination, the slide-bar, the shifting cam-plate, a main shaft, a rack operated directly thereby, a shifting pinion engaging the rack, a shaft 43, connections between said shaft and the shifting pinion and between said shaft and the shifting cam-plate, a pivoted lever L for shifting the pinion, a spring in connection with one end of the lever for holding it normally in one position, a lever 43, connections therefrom to the opposite end of the lever L for causing the shifting action, means for operating the lever 43, and pattern mechanism for controlling the operation of the said lever, substantially as described.

17. In combination, the slide-bar, the shifting cam-plate, a main shaft, a rack operated directly thereby, a shifting pinion engaging said rack, connections between the pinion and the shifting cam-plate, a shifting-lever L, a lever 43 for operating lever L, with operating connections between the two, a shifting roller on the lever 43, a cam on the main shaft adapted to operate the lever 43 through its roller when the said roller is shifted into range therewith, a pattern mechanism, and connections between the pattern mechanism and the roller for shifting the same, whereby the lever 43 is depressed and the pinion shifted into engagement with the rack and the needles operated.

18. In combination, the slide-bar, the shifting cam-plate, a main shaft, a rack and pinion in shifting relation to each other, connections between the pinion and shifting cam-plate, a lever L for causing the engagement of the pinion and rack, a lever 43, connections between the levers 43 and L, a shifting roller on the lever 43, a pattern mechanism, a shifting-lever operated by said pattern mechanism for shifting the roller, a shifting cam on the main shaft for operating the lever 43 through its roller, and connections from the pattern mechanism to shift the said cam, substantially as described.

19. In combination, the slide-bar, the shifting cam-plate, a main shaft, a rack and pinion in shifting relation to each other, connections between the pinion and shifting cam-plate, a lever L, a lever 43, connections between the levers 43 and L, a shifting roller on the lever 43, a shifting cam on the main shaft, a cam-piece $m$ carried thereby, a pattern mechanism, and connections extending therefrom and operated thereby to the shifting roller and cam for causing the shifting action thereof, substantially as described.

20. In combination, the slide-bar, the shifting cam-plate, a main shaft, a wheel K thereon, a rack on its periphery, a shifting pinion, connections therefrom to the shifting cam-plate, a lever 43, connections between said lever and the shifting pinion, a cam on the main shaft for operating lever 43, a pattern mechanism, and connections therefrom for controlling the operation of the lever 43, substantially as described.

21. In combination, the slide-bar, the shifting cam-plate, the rack and pinion in shifting relation to each other, operating devices between the pinion and shifting cam-plate, the lever 43, connections therefrom to the pinion, a shifting roller on the lever 43, a main shaft, a cam-piece carried thereby for depressing the lever 43 through its roller, a constantly-operating lever N, a lever, as $M^3$, with connections to the shifting roller, a cylinder $N^2$, stops thereon for preventing the movement of the lever $M^3$, means for operating the cylinder, and a pattern mechanism for controlling the action of the same, substantially as described.

22. The slide-bar, the shifting cam-plate, a main shaft, a wheel K thereon, a rack $l$ on said wheel, a shifting pinion, connections between said pinion and the shifting cam-plate, means for shifting said pinion into and out of engagement with the rack $l$, a flange on said pinion having a cut-away portion adapted to grooves and plain portions on the wheel K, substantially as described.

23. In combination, the slide-bar, the shifting cam-plate, the eccentric disk, connections therefrom to the shifting cam-plate, a shaft 38 having sliding connection with the disk, a rack, a main shaft, a shifting pinion, a sprocket-chain between the pinion and shaft 38, a shifting-lever L, a lever 43, a band $l^5$ between the levers 43 and L, a main shaft, a shifting cam thereon, a shifting roller on the lever 43, a constantly-operating lever N, a lever $M^3$, connections therefrom to the shifting roller, a cylinder $N^2$, stops thereon for preventing the movement of the lever $M^3$, devices for operating the cylinder, and a pattern mechanism for controlling the action of said cylinder, substantially as described.

24. In combination, a point-carriage, a threaded shaft for moving said carriage laterally, and a point-block supported on said carriage and having forward and backward movement independent of the movement of the carriage, and means for imparting such movement thereto, substantially as described.

25. In combination, a point-carriage, a point-block thereon, a threaded shaft for moving the carriage laterally, means for moving the threaded shaft, a second shaft R', having splined connection with the carriage, means for actuating said shaft, and a pinion and rack between said shaft and the point-block, substantially as described.

26. In combination with the point-carriage, a point-block thereon, a shaft $R^2$, threaded to engage said carriage and to move it laterally, the shafts $R'$ $R^3$, and splined connections between said shafts and the carriage and point-block for imparting to the said point-block forward, backward, and lifting movement, with means for operating said shaft, substantially as described.

27. In combination, a threaded shaft $R^2$, means for moving the same, a point-carriage movable laterally thereon, a sliding plate $Q'$ on said carriage, a point-block pivoted on said sliding plate, a second shaft $R'$, means for actuating the same, a pinion splined thereon, and a rack on the sliding plate $Q'$, engaging said pinion, substantially as described.

28. In combination, a threaded shaft $R^2$, a point-carriage movable laterally by the revolution of said shaft, a pivoted point-block supported by said carriage, means for moving said point-block forward and backward, a rock-shaft $R^3$, and arms $r^{31}$, supported from said shaft, substantially as described.

29. In combination, a threaded shaft, means for moving the same, a point-carriage mounted thereon, a sliding plate $Q'$, a point-block pivoted on said plate, a second shaft $R'$, means for actuating said shaft, a pinion splined thereto engaging a rack on the sliding plate to advance and retract the point-block, a third shaft $R^3$, arms supported therefrom having inclines, and a spring in connection with the point-block.

30. In combination, a laterally-movable point-carriage, a point-block thereon carrying points, a threaded shaft for imparting lateral movement to said carriage, operating mechanism for said threaded shaft, a main shaft for imparting movement to said mechanism, a pattern mechanism for controlling the action of the threaded shaft, and intermediate mechanism between the pattern mechanism and the main shaft for effecting this controlling action, whereby the rotation of the shaft $R^2$ is made intermittent, substantially as described.

31. In combination with the point-carriages on opposite sides of the machine, a threaded shaft for each carriage, said shafts being formed with zigzag grooves having cam-faces, a main shaft with operating connections between said main shaft and the threaded shaft on each side of the machine, a pattern mechanism, and operating connections from said pattern mechanism for controlling the action of the threaded shafts, and stationary pins on the frame engaging with said grooves, the cam-faces of one shaft being set reversely to the other, whereby one threaded shaft is rendered inoperative and the carriage on the other advanced its full distance, substantially as described.

32. In combination with the point-carriages on opposite sides of the machine, a threaded shaft for each carriage, said shaft being formed with zigzag grooves having cam-faces, a main shaft, connections from the said shaft to the two threaded shafts for operating them simultaneously, a pattern mechanism for controlling the action of said operating connection, whereby the movements of the two shafts are intermittent, and a stationary pin in connection with the zigzag grooves, the cam-faces being set reversely to each other, whereby the threaded shaft on one side of the machine is rendered inoperative, while the carriage on the other is advanced its full distance, substantially as described.

33. In combination with the point-carriages on opposite sides of the machine, a threaded shaft for each carriage, said shafts being formed with zigzag grooves having cam-faces, a main shaft, a shaft 91, operating mechanism between the main shaft and shaft 91, a pattern mechanism with connections for controlling said operating connections to make the movements of the threaded shaft intermittent, a connection between said shaft 91 and the two threaded shafts for turning the same simultaneously to partially advance the point-carriages, and stationary pins engaging with said zigzag grooves, the cam-faces of one shaft being set reversely to the other, substantially as described.

34. In combination, a point-carriage, a threaded shaft for moving it laterally, a main shaft, a lever $s'$ operated therefrom, and operating connections between said lever and the threaded shaft, substantially as described.

35. In combination, a point-carriage, a threaded shaft for moving it laterally, a shaft 91, a chain-connection therefrom to the threaded shaft, a main shaft, a cam thereon, a lever $s'$ operated therefrom, a connection between the lever $s'$ and shaft 91, and pattern mechanism for controlling the operation of the lever $s'$, substantially as described.

36. In combination, the point-carriages on opposite sides of the machine, a pair of threaded shafts for moving said carriages laterally, a shaft 91, an operating connection from shaft 91 to both the threaded shafts, a main shaft, the lever $s'$ operated thereby, a ratchet-wheel on the shaft 91, a pair of reversely-operating pawls, and connections from the lever $s'$ to each of said pawls, substantially as described.

37. In combination with the lever $s'$, a threaded shaft, a point-carriage movable laterally thereby, connections from the lever $s'$ to the threaded shafts, a main shaft, and a cam $s^4$ on the main shaft for operating the lever $s'$, substantially as described.

38. In combination with the lever $s'$, a threaded shaft, a point-carriage movable laterally on the threaded shaft, connections between the lever $s'$ and the threaded shaft, a main shaft, a cam thereon for operating the lever $s'$, a rocking shaft, pattern mechanism, and connections to the rocking shaft for controlling the action of the lever $s'$, substantially as described.

39. In combination, the lever $s'$, the threaded shaft, connections between the lever $s'$ and threaded shaft, a point-carriage on the threaded shaft, a main shaft, a disk on said shaft, a cam-flange $s^4$ on said disk, a wheel on the lever $s'$, playing normally on the periphery of the disk, the rock-shaft $s^5$, a lever 93, connected to the rock-shaft, a shifting cam for operating the rock-shaft, pattern mechanism, and connections therefrom to shift the cam, substantially as described.

40. In combination with the point-carriage, a pivoted point-block thereon, arms $r^{31}$ for depressing said points, a lever 85, means for operating said lever, and connections from said lever to the arms $r^{31}$ for rocking the same, substantially as described.

41. In combination with the point-carriage, a pivoted point-block, a rocking shaft $R^3$, arms $r^{31}$, carried by said shaft, a lever 85, a rod between said lever and shaft $R^3$, a main shaft, a cam on said shaft for operating the lever, and a spring for retracting said lever, substantially as described.

42. In combination with the main shaft, a set of shifting cams carried on splines on said shaft, a reciprocating pin U, means to reciprocate said pin, the lever $v$, the cylinder, controlling-stops on said cylinder for the lever $v$, a pattern-chain, and a controlling connection between said pattern-chain and cylinder, substantially as described.

43. In combination with the main shaft and shifting cam thereon, the constantly-operating levers $M^3$ and $v'$, connections between said levers and the shifting cam, the cylinder $N^2$, controlling-stops thereon for preventing the movement of the levers $M^3$ and $v'$, the lever N for operating the levers $M^3$ $v'$, a constantly-operating pawl, a ratchet-wheel on the cylinder $N^2$, normally inoperative under the movement of said pawl, and a pattern mechanism for causing the pawl to engage with the ratchet-wheel and thereby move the cylinder, substantially as described.

44. In combination with the main shaft and shifting cam thereon, the levers $M^3$ $v'$, means for operating said levers, connections between said levers and the shifting cam, a controlling-cylinder having stops thereon for preventing the movement of the levers $M^3$ $v'$, and a pattern mechanism controlling the action of the cylinder, substantially as described.

45. In combination with the needles and points of a knitting-machine, a pattern-chain, a supplemental controlling mechanism, connections between the pattern-chain and controlling mechanism, shifting cams on the main shaft, connections between the controlling mechanism and the said cams, operating-levers moved by the said cams, and connections from said cams to the needles and transfer-points, substantially as described.

46. In combination with the needles and points of a knitting-machine, a pattern mechanism, a main shaft, a supplemental controlling mechanism, intermediate connections therefrom to the main shaft, consisting of a ratchet-wheel having irregular teeth and a constantly-operating lever $N'$ and pawl, connections from the primary pattern-chain to move the ratchet from normal position, cams on the main shaft, operating-levers for the needles and points actuated thereby, and connections between said levers and the points and needles, substantially as described.

47. In combination, the slide-bar, the shifting cam-plate, the point-carriage and points, the operating-lever 43, the shifting cams on the main shaft, the oscillating levers $M^3$ and $v'$, means to oscillate said levers, devices between lever $M^3$ and lever 43 and between the lever $v'$ and the shifting cams, the cylinder $N^2$, the stops thereon for controlling said oscillating levers, and the pattern mechanism for throwing the cylinder $N^2$ into action, substantially as described.

48. In combination, the slide-bar, the shifting cam-plate, the needles, the lever 43, having shifting roller, and connections from said lever to the shifting cam-plate, the oscillating lever $M^3$, connections therefrom for operating said shifting roller, the transfer-points, a main shaft, the shifting cam thereon, the lever operated thereby, with connections to the transfer-points, the oscillating lever $v'$, the switch-pin U, the cylinder having controlling-stops thereon, the pawl and ratchet, the lever $N'$, carrying said pawl, operated by the tappet 52, the supplemental lever N for operating the oscillating levers, the pawl and disk $o$ for moving the cylinder from normal position, pattern mechanism, and connections therefrom to the said pawl for moving the same, substantially as described.

49. In combination, the slide-bar, the shifting cam-plate, the needles, the transfer-points, the shifting cams on the main shaft, levers actuated by said cams when shifted, operating connections from said levers to the shifting cam-plate and to the transfer-points, a controlling-cylinder, means for actuating the same, constantly-operating levers governed by the controlling-cylinder and adapted to be arrested thereby, and a pin operated by one of said levers and adapted to shift the cams on the main shaft, substantially as described.

50. In combination, the needles, the lifting-bar for elevating the empty needles, the screw-shaft for operating the lifting-bar, the main shaft, and positive connections therefrom to the screw-shaft, substantially as described.

51. In combination, the needles, the lifting-bars on each side of the machine for raising the empty needles out of action, a screw-shaft for operating each lifting-bar, cam-grooves in each screw-shaft set reversely to each other, stationary pins engaging said grooves, a main shaft, and connections from said main shaft to the screw-shafts for giving them simultaneous action, substantially as described.

52. In combination with the needles, the lifting-bar on each side of the machine for throwing them out of work, a threaded shaft for operating each bar, a point-carriage, a threaded shaft for operating each point-carriage, a main shaft, and connections from said main shaft to the four threaded shafts of the point-carriages and lifting-bars, substantially as described.

53. In combination with the needles, the lifting-bar for throwing them out of work, a main shaft, a notched disk and pawl, operating connections between said pawl and the main shaft, a screw-shaft for operating the lifting-bar, and connections from the disk to the screw-shaft, substantially as described.

54. In combination, the thread-guide, a reversible spindle therefor, the carriage-frame, the guide-bars, the operating-bar adapted to move up and down, means for actuating said bar, and connections between said bar and the spindle, substantially as described.

55. In combination, the thread-guide and spindle, the raising and lowering operating-bar, connections between said bar and spindle, the guide-bars, the adjustable stops, and operating connections between said stops and the operating-bar, substantially as described.

56. In combination, the thread-guide and spindle, the raising and lowering bar, connections between said bar and spindle, the brackets, connections between said brackets and bar, adjustable stops, and connections to the brackets, substantially as described.

57. In combination, the thread-guide and spindle, the brackets, the raising and lowering operating-bar, connections between said bar and spindle, and connections between said bracket and bar, consisting of the slotted plate $h^3$, and the studs on the operating-bar fitting said slots, the bar $h^4$ between the brackets, and the adjustable stops on said bar, substantially as described.

58. In combination with the main shaft and shifting cam thereon, the constantly-operating levers $M^3$ and $v'$, connections between said levers and the shifting cams, the cylinder $N^2$, stops thereon for controlling the levers $M^3$ $v'$, the ratchet on the cylinder, the lever $N'$, the cam constantly operating the same, the lever $N$, operated by the lever $N'$ for operating the levers $M^3$ and $v'$, and the pawl carried by the lever $N'$ for operating the cylinder $N^2$, substantially as described.

In testimony whereof I have signed my name to this specification in the presence of two subscribing witnesses.

FRANK WILCOMB.

Witnesses:
MALCOM W. RICHARDS,
GEO. L. BARNES.